United States Patent
Dobrynin et al.

(10) Patent No.: US 10,963,499 B2
(45) Date of Patent: Mar. 30, 2021

(54) GENERATING COMMAND-SPECIFIC LANGUAGE MODEL DISCOURSES FOR DIGITAL ASSISTANT INTERPRETATION

(71) Applicant: AIQUDO, INC., San Jose, CA (US)

(72) Inventors: Vladimir Dobrynin, Saint Petersburg (RU); David Patterson, Jordanstown (GB); Niall Rooney, Belfast (GB)

(73) Assignee: AIQUDO, INC., Campbell, CA (US)

( * ) Notice: Subject to any disclaimer, the term of this patent is extended or adjusted under 35 U.S.C. 154(b) by 49 days.

(21) Appl. No.: 16/234,221

(22) Filed: Dec. 27, 2018

(65) Prior Publication Data

US 2019/0205322 A1   Jul. 4, 2019

Related U.S. Application Data

(63) Continuation-in-part of application No. 15/988,620, filed on May 24, 2018, now Pat. No. 10,176,171.
(Continued)

(51) Int. Cl.
*G06F 16/33* (2019.01)
*G06F 16/35* (2019.01)
(Continued)

(52) U.S. Cl.
CPC ............ *G06F 16/334* (2019.01); *G06F 9/454* (2018.02); *G06F 16/3329* (2019.01);
(Continued)

(58) Field of Classification Search
CPC ................................. G10L 15/18; G06F 40/20
See application file for complete search history.

(56) References Cited

U.S. PATENT DOCUMENTS

| 5,873,064 A | 2/1999 | De Armas et al. |
| 6,125,347 A | 9/2000 | Cote et al. |

(Continued)

OTHER PUBLICATIONS

International Search Report and Written Opinion dated Apr. 2, 2019 in International Patent Application No. PCT/US18/67992, 10 pages.
(Continued)

*Primary Examiner* — Brian L Albertalli
(74) *Attorney, Agent, or Firm* — Shook, Hardy & Bacon L.L.P.

(57) ABSTRACT

Disclosed are techniques for generating a language model that is applicable to the interpretation of commands for invoking application-based actions via a digital assistant device. In various embodiments, command templates that are each mapped to one of a plurality of action datasets are obtained to generate synthetic documents of a language model document corpus. Each synthetic document can be modified to include a tag that corresponds to an associated command template from which the document's generation was based. The language model can include a plurality of document clusters that are generated based on the modified synthetic documents, among other things. In this way, when a command is received from a digital assistant device, a relevant set of modified synthetic documents from the generated plurality of document clusters can be identified, and one of the plurality of action datasets mapped to one of the plurality of defined commands determined to correspond to the tag included in a determined most relevant modified synthetic document can be selected.

20 Claims, 17 Drawing Sheets

Related U.S. Application Data

(60) Provisional application No. 62/611,996, filed on Dec. 29, 2017.

(51) Int. Cl.
    *G06F 16/332*     (2019.01)
    *G06F 9/451*     (2018.01)
    *G06F 40/35*     (2020.01)
    *G06F 40/186*     (2020.01)

(52) U.S. Cl.
    CPC ............ *G06F 16/35* (2019.01); *G06F 16/355* (2019.01); *G06F 40/186* (2020.01); *G06F 40/35* (2020.01)

(56) References Cited

U.S. PATENT DOCUMENTS

| | | | |
|---|---|---|---|
| 6,188,976 B1* | 2/2001 | Ramaswamy | G10L 15/183 704/1 |
| 8,620,842 B1* | 12/2013 | Cormack | G06N 20/00 706/12 |
| 8,805,766 B2* | 8/2014 | Ray | G06F 16/345 706/47 |
| 8,805,845 B1 | 8/2014 | Li et al. | |
| 9,002,848 B1 | 4/2015 | Peng et al. | |
| 9,280,610 B2 | 3/2016 | Gruber et al. | |
| 9,619,468 B2* | 4/2017 | Adams | G06F 16/24575 |
| 9,633,004 B2 | 4/2017 | Giuli et al. | |
| 9,966,065 B2 | 5/2018 | Gruber et al. | |
| 9,972,304 B2 | 5/2018 | Paulik et al. | |
| 10,180,929 B1 | 1/2019 | Kesin et al. | |
| 10,394,864 B2 | 8/2019 | Lee et al. | |
| 2002/0065857 A1 | 5/2002 | Michalewicz et al. | |
| 2002/0078091 A1 | 6/2002 | Vu et al. | |
| 2002/0161763 A1 | 10/2002 | Ye et al. | |
| 2004/0111438 A1 | 6/2004 | Chitrapura et al. | |
| 2005/0102301 A1 | 5/2005 | Flanagan | |
| 2005/0114161 A1 | 5/2005 | Garg et al. | |
| 2006/0004747 A1 | 1/2006 | Weare | |
| 2006/0167930 A1 | 7/2006 | Witwer et al. | |
| 2007/0112755 A1 | 5/2007 | Thompson et al. | |
| 2007/0271292 A1 | 11/2007 | Acharya et al. | |
| 2009/0070312 A1 | 3/2009 | Patterson | |
| 2009/0094233 A1 | 4/2009 | Marvit et al. | |
| 2009/0164416 A1 | 6/2009 | Guha | |
| 2009/0254336 A1 | 10/2009 | Dumais et al. | |
| 2009/0287668 A1 | 11/2009 | Evans et al. | |
| 2012/0102121 A1 | 4/2012 | Wu et al. | |
| 2012/0109946 A1 | 5/2012 | Qian | |
| 2012/0124044 A1 | 5/2012 | Bhattacharya et al. | |
| 2013/0013644 A1 | 1/2013 | Sathish et al. | |
| 2013/0138641 A1 | 5/2013 | Korolev et al. | |
| 2013/0159313 A1 | 6/2013 | Jakubik | |
| 2013/0179423 A1* | 7/2013 | Gur | G06F 16/24578 707/710 |
| 2014/0006406 A1 | 1/2014 | Kafati et al. | |
| 2014/0156282 A1 | 6/2014 | Madere et al. | |
| 2014/0244254 A1 | 8/2014 | Ju et al. | |
| 2014/0278413 A1 | 9/2014 | Pitschel et al. | |
| 2014/0280238 A1 | 9/2014 | Cormack et al. | |
| 2015/0199417 A1 | 7/2015 | Ashparie et al. | |
| 2015/0356174 A1 | 12/2015 | Narayana et al. | |
| 2016/0012818 A1 | 1/2016 | Faizakof et al. | |
| 2016/0019471 A1 | 1/2016 | Shin et al. | |
| 2016/0132482 A1 | 5/2016 | Salome et al. | |
| 2016/0162456 A1* | 6/2016 | Munro | G06F 40/137 704/9 |
| 2016/0171764 A1 | 6/2016 | Chew et al. | |
| 2016/0179787 A1 | 6/2016 | Deleeuw | |
| 2016/0225370 A1 | 8/2016 | Kannan et al. | |
| 2016/0260430 A1* | 9/2016 | Panemangalore | G10L 15/1822 |
| 2017/0061956 A1 | 3/2017 | Sarikaya et al. | |
| 2017/0235820 A1 | 8/2017 | Conrad et al. | |
| 2018/0032606 A1 | 2/2018 | Tolman et al. | |
| 2018/0144046 A1 | 5/2018 | Braga et al. | |
| 2019/0287512 A1* | 9/2019 | Zoller | G06Q 50/01 |

OTHER PUBLICATIONS

International Search Report and Written Opinion dated Apr. 4, 2019 in International Patent Application No. PCT/US2018/067938, 6 pages.

International Search Report and Written Opinion dated Apr. 24, 2019 in International Patent Application No. PCT/US18/68002, 11 pages.

International Search Report and Written Opinion dated Jun. 14, 2019 in International Patent Application No. PCT/US18/67936, 9 pages.

Jabaian, Bassam, Laurent Besacier, and Fabrice Lefevre. "Investigating multiple approaches for slu portability to a new language", Eieventh Annual Conference of the International Speech Communication Association. 2010. (Year: 2010).

Su, Yu, et al. "Building natural language interfaces to web APIs", Proceedings of the 2017 ACM on Conference on Information and Knowledge Management. ACM, 2017. (Year: 2017).

Campagna, Giovanni, et al. "Almond: The architecture of an open, crowdsourced, privacy-preserving, programmable virtual assistant", Proceedings of the 26th International Conference on World Wide Web. International World Wide Web Conferences Steering Committee, 2017. (Year: 2017).

Chowdhury, Shammur Absar, et al. "Cross-language transfer of semantic annotation via targeted crowdsourcing", Fifteenth Annual Conference of the International Speech Communication Association. 2014. (Year: 2014).

International Preliminary Report on Patentability received for PCT Application No. PCT/US2018/067936, dated Jul. 9, 2020, 8 pages.

International Preliminary Report on Patentability received for PCT Application No. PCT/US2018/067992, dated Jul. 9, 2020, 9 pages.

International Preliminary Report on Patentability received for PCT Application No. PCT/US2018/068002, dated Jul. 9, 2020, 10 pages.

International Preliminary Report on Patentability received for PCT Application No. PCT/US2018/067938, dated Jul. 9, 2020, 5 pages.

Non-Final Office Action dated Jul. 8, 2020 in U.S. Appl. No. 16/234,219, 14 pages.

Non-Final Office Action dated Jul. 22, 2020 in U.S. Appl. No. 16/234,215, 14 pages.

Notice of Allowance dated Oct. 15, 2020 in U.S. Appl. No. 16/234,219, 8 pages.

Notice of Allowance dated Nov. 18, 2020 in U.S. Appl. No. 16/234,215, 7 pages.

* cited by examiner

GENERATING COMMAND-SPECIFIC LANGUAGE MODEL DISCOURSES FOR DIGITAL ASSISTANT INTERPRETATION

CROSS-REFERENCE TO RELATED APPLICATIONS

This application is a continuation-in-part of U.S. patent application Ser. No. 15/988,620, titled "LANGUAGE AGNOSTIC COMMAND-UNDERSTANDING DIGITAL ASSISTANT," and filed May 24, 2018, which claims priority to U.S. Provisional Patent Application No. 62/611,996, filed Dec. 29, 2017, each of which is assigned or under obligation of assignment to the same entity as this application, the entire contents of each application being herein incorporated by reference.

BACKGROUND

Digital assistants have become ubiquitous in a variety of consumer electronic devices. Modern day digital assistants employ speech recognition technologies to provide a conversational interface between users and electronic devices. These digital assistants can employ various algorithms, such as natural language processing, to improve the interpretation of commands (e.g., requests for specific actions to be performed and/or for specific information to be provided) received from a user. Consumers have expressed various frustrations with conventional digital assistants due to, for instance, frequent misinterpretations of spoken commands, unavailability of services due to weak signals or a lack of signal, privacy concerns, and the general requirement that the consumer must structure their spoken commands in a language and/or parlance that is uncomfortable or unnatural for them. Further, the actions resulting from these commands in existing digital assistants typically do not execute within applications selectively installed on users' mobile devices, which often is what users would like, particularly when they are on the move.

Moreover, as the general pace of society continues to accelerate, so do users' desires to consume readily-available information. Digital assistants can enable a seamless interface between users and their devices, and can provide a much faster means for the exchange of input and output information. One digital assistant, particularly the "Q" digital assistant developed by Aiqudo Inc., headquartered in San Jose, Calif., provides such a seamless interface. In other words, the "Q" digital assistant can, among many other things, perform a series of custom or predefined tasks (e.g., each series of tasks or computer operations representing an "action") based on a received command to accomplish a desired result.

SUMMARY

This Summary is provided to introduce a selection of concepts in a simplified form that further are described below in the Detailed Description. This Summary is not intended to identify key features or essential features of the claimed subject matter, nor is it intended to be used as an aid in determining the scope of the claimed subject matter.

Embodiments described in the present disclosure generally are directed towards command interpretation techniques relating to a digital assistant for computing devices, such as those that are on the person of a user when the user is on the move (e.g., cell phones, connected watches, devices tethered to cars). In particular, embodiments provide an improved context-understanding digital assistant employable to understand commands (e.g., queries, instructions) for invoking corresponding computer processes without human intervention. In other words, the described embodiments relate to improved techniques for generating language models that facilitate an accurate and automated understanding of intention of commands (expressed as "commands") received by a digital assistant computing device, and employing the generated language models to interpret the received commands to select appropriate sets of computer processes (e.g., actions) to invoke on the digital assistant computing device in response to the received commands.

In statistical natural language processing systems, natural language understanding is generally facilitated utilizing mathematical algorithms that focus on statistical inferences to automatically generate rules based on an analyzed corpora of documents. However, such conventional systems are still limited in their ability to accurately understand the context of a received input (e.g., command, speech input), which in a digital assistant system, can be problematic and annoying to consumers. As such, in accordance with various embodiments of the present disclosure, various techniques are described applying principles of discourse communities, semiotics, and intertextuality for the generation of more sophisticated language models, such that computing devices, like a digital assistant, can better interpret and decipher inputs received from a user. Employing techniques described herein, a digital assistant can receive a vague or undefined command that has not been mapped to an operation (e.g., action) to be performed, and accurately determine the likely meaning of the received vague or undefined command to initiate execution of the appropriate operation.

Various embodiments described herein employ lower-level concepts discussed in U.S. Pat. No. 7,747,593 (the '593 patent), titled "Computer Aided Document Retrieval," which is assigned or under obligation of assignment to the same entity as this application, the entire contents of which is herein incorporated by reference. The '593 patent generally describes techniques for determining cluster attractors for a document corpus having a plurality of documents, clustering the plurality of documents based on the determined cluster attractors, indexing the document corpus into clusters based on specific narrow contexts (e.g., the determined cluster attractors) automatically identified from the corpus as a whole, and discovering narrow contexts (e.g., determined cluster attractors) relevant to a received query to facilitate retrieval from the corpus. Among other things, the '593 patent describes that a narrow contexts can be determined for each electronic document in a plurality of electronic documents based on a set of words included in the electronic document determined to be shared by (e.g., also included in) one or more other electronic documents in the plurality of electronic documents. Among other things, one or more document clusters can be generated from the plurality of electronic documents based on the determined contexts.

Employing such concepts, the various embodiments described herein improve on these techniques by generating improved semantic groups of documents, identifying representative phrases of semantic document groups, discovering topics and/or sub-topics of semantic document groups, indexing the documents of a document corpus based on the discovered topics and/or sub-topics, and employing search and interpretation techniques to automatically understand commands received via a digital assistant. Further embodiments describe techniques for generating a corpus of documents that correspond to commands interpretable by a digital assistant, and employing the aforementioned techniques for generating a language model that is specific to the digital assistant command space. Employing such techniques, a digital assistant device and/or associated digital assistant server can generate, develop, maintain, and/or employ a more sophisticated and relevant language model to understand context and meaning of a received command, such as those relevant to digital assistants, with minimal to no training intervention. In this regard, in situations where an enormous quantity of potential commands would be nearly impossible to identify (e.g., for mapping to appropriate actions) or intelligently interpret for an ever-increasing number of available mobile applications, a digital assistant device and/or associated digital assistant server employing technologies described herein can accurately understand the meaning of a received command to invoke an appropriate action on a digital assistant device in accordance with embodiments described herein.

In some embodiments, a plurality of defined commands that are each mapped to one of a plurality of action datasets is obtained. For each defined command of the obtained plurality of defined commands, an associated set of synthetic documents is generated based on a determined relevant set of documents retrieved from at least one remote data repository. Each synthetic document of the generated sets of synthetic documents is then modified to include a tag that corresponds to the associated defined command. In accordance with some embodiments, a plurality of document clusters is generated based on the modified synthetic documents, thereby providing a means for generating a command-specific language model index. When a command is received from a digital assistant device, a search of the command is performed utilizing the generated command-specific language model index, and a set of modified synthetic documents from the generated plurality of document clusters determined relevant to the received command is identified and ranked based on relevance to the received command. One of the plurality of action datasets mapped to one of the plurality of defined commands determined to correspond to the tag included in at least one determined most relevant modified synthetic document of the identified set of modified synthetic documents is selected for communication to the digital assistant device. In some aspects, a plurality or a predefined number of determined most relevant modified synthetic documents can be selected, ranked, scored, groups, or indexed, among other things, based on various determinations, such as those described below and in part described in U.S. patent application Ser. No. 16/047,782, titled "Ranking and Boosting Relevant Distributable Digital Assistant Operations," which is assigned or under obligation of assignment to the same entity as this application, the entire contents of each application being herein incorporated by reference.

In some embodiments, employing linguistic principles of intertextuality, representative phrases corresponding to document clusters generated for indexing electronic documents can be determined. In other words, terms or phrases that are representative of a context communicated throughout the documents included in each document cluster are identified. The documents of a given document corpus, such as one generated based on retrieved relevant documents and/or generated synthetic documents, are clustered based on calculated weights and probability distributions of the various terms included therein, among other things. For each document in a generated document cluster, the document (e.g., a seed document) is compared relative to other documents within the generated document cluster to determine and define a document "section" associated with the document of a generated document cluster. The defined document section includes electronic documents contextually relevant to a seed document. Further, the documents within an identified section of each seed document can be compared (e.g., to the seed document) to identify terms that are common or shared there between, such that the identified common terms are representative of the seed document's section. The identified common terms representative of a seed document can be ranked to identify a most relevant set of representative terms. For all seed documents (e.g., documents) in a document cluster, a score or weight is calculated for the identified common terms representative of its seed documents (e.g., documents). In this regard, a highest scored number of identified common terms representative of the documents within a document cluster can be selected and stored as a representative set of terms or phrases for the document cluster. Provided the foregoing, the representative sets of terms or phrases representing the various document clusters can be indexed and employed to more efficiently search the corpus of electronic documents for purposes of interpreting received commands, among other things.

In some embodiments, documents of a generated document corpus that are clustered for purposes of generating a relevant language model index, such as one directed to digital assistant commands, can be strategically linked (e.g., merged) to generate organized sets of documents (i.e., semantic groups of documents) that provide an improved and more efficient language model index employable for purposes of automated command interpretation, among other things. A document corpus comprising a plurality of electronic documents is grouped into various document clusters, and a representative set of terms or phrases that represent the documents within each cluster are assigned (e.g., mapped) to the cluster. Various subsets of the clusters are then selectively merged (e.g., logically linked) based on identified common representative sets of terms or phrases there between, among other things. In this way, semantic groups, identifiable by the representative sets of terms or phrases for the document clusters therein, can be generated for purposes of generating a searchable and higher-level language model index. The semantic groups of electronic documents, generated from a corpus of unstructured electronic documents, can be employed to identify and extract, among other things, concepts, topics, sub-topics, and relative relationships between documents of a document corpus, which can be stored, indexed, and employed to improve efficiencies in natural language processing, such as interpreting commands received from a digital assistant.

Employing the various embodiments described herein, a more sophisticated language model and searchable index can be generated and employed to interpret commands received from a digital assistant device, despite the received commands being undefined or unmapped to a corresponding action. In this way, received commands can be intelligently interpreted to select and initiate an appropriate action for execution via the digital assistant device.

BRIEF DESCRIPTION OF THE DRAWINGS

The present disclosure is described in detail below with reference to the attached drawing figures, wherein.

DETAILED DESCRIPTION

Figure 1:
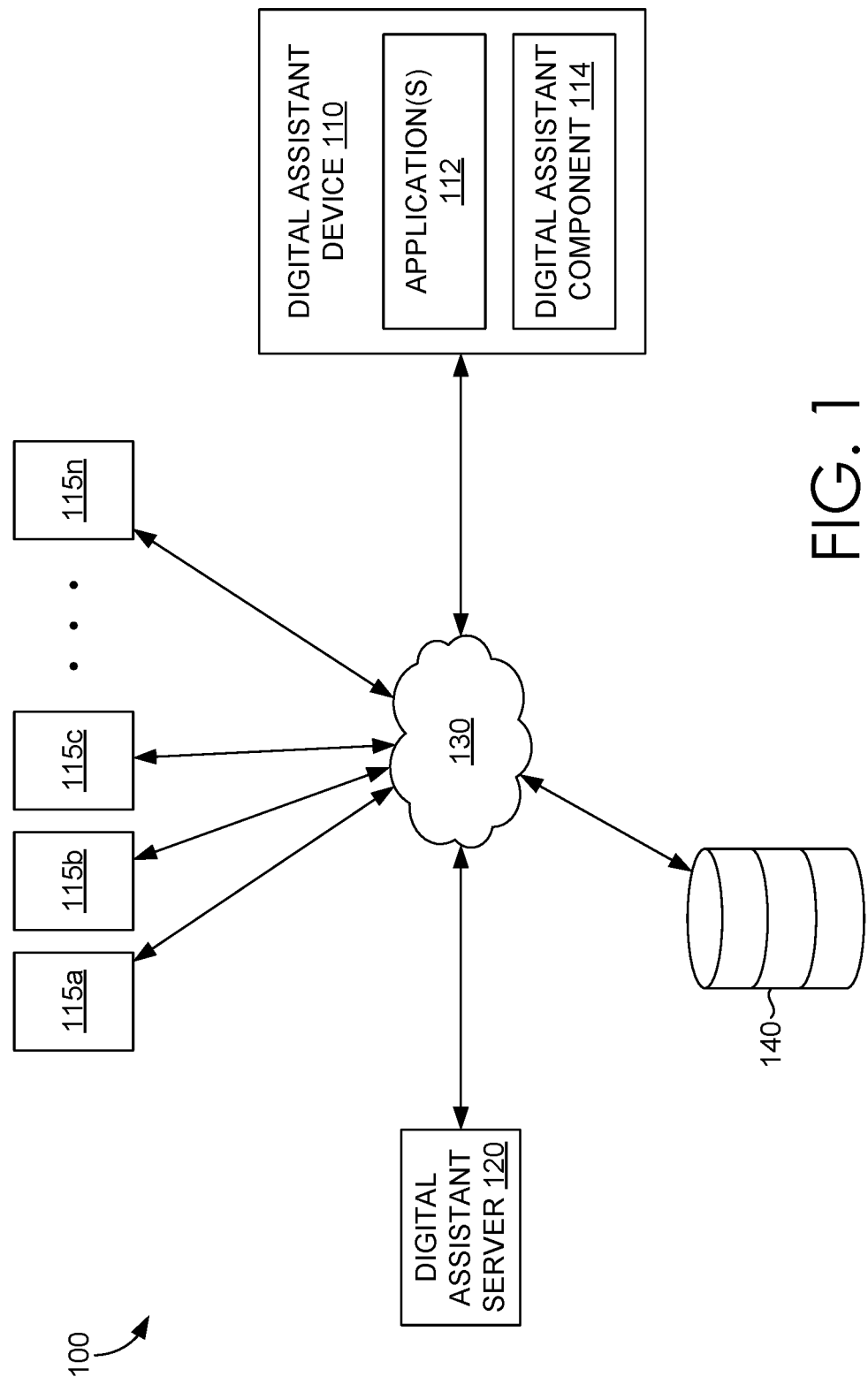
FIG. 1 depicts an exemplary operating environment suitable for use in implementing some embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As electronic devices become more integrated into our daily lives, so do the methods in which we can interface with them. Digital assistants have found a place in many peoples' homes, providing voice-activated services that can assist users with various tasks, from a basic level to a very advanced level. However, conventional digital assistants are mostly limited to the capabilities that the service provider and their developers implement. Some service providers and developers provide an open interface (e.g., an API) such that third-parties can develop custom services that can essentially "plug in" to the digital assistant and provide additional services. In this regard, users are generally at the mercy of these developers and must adapt to the specific commands programmed into these digital assistants.

For the most part, modern-day society has adopted the use of mobile computing devices, such as smart phones. Users generally prefer to carry portable computing devices on their person, having a readily-available resource for accessing information and providing a means for communication. Users can download and install applications of their choosing, and maintain settings that are customized to their personal preferences. The number of applications providing unique services to users is astounding, increasing by the thousands daily. In this regard, it is improbable to provide digital assistant services that can cater to the needs of all users, particularly based on the various services provided by the applications preferred and utilized by the users. Moreover, it is impractical to provide digital assistant services that can cater to the natural dialect of these users.

As such, a digital assistant having easily customizable commands and actions that can be performed by the digital assistant, based on the receipt of a command in a variety of languages and/or dialects, alleviates the aforementioned issues. That is, by providing the power of intuitive command and action on-boarding to the users, each user can provide unique commands that may be natural for only a very small percentage of their peers. Yet, a digital assistant having the ability to understand the requirements and needs of such users can be groundbreaking.

The maintenance and training of a language model that is employable for interpreting digital assistant commands applicable to an ever-growing marketplace of applications, such as mobile applications, can be unreasonably difficult to maintain and resource intensive. As briefly noted above, the "Q" digital assistant, developed by Aiqudo, Inc., headquartered in San Jose, Calif., has implemented customizable automation into the digital assistant. In other words, the "Q" digital assistant can, among many other things, perform a series of predefined tasks (e.g., "actions") based on the receipt of an input (e.g., a "command"), which can be text-based (e.g., converted from speech), to accomplish a desired result. In addition, the "Q" digital assistant provides a plethora of additional services, such as crowd-sourced definitions of various commands and action datasets that are quality-assured by intelligent algorithms, essentially eliminating the need for a novice user to "train" their digital assistant to work with their preferred applications. While solutions made available by the "Q" digital assistant can alleviate many of the concerns posed by conventional digital assistants, such as the ability to generate customizable commands and actions, there still remain some areas of improvement to properly understand commands received from a user of a digital assistant device.

Aspects of the technology described herein are generally directed towards natural language processing techniques for invoking determined most-relevant mobile application operations via a digital assistant device. Various embodiments described herein relate to solutions for generating more efficient language models employable to determine the understanding and desire communicated through a command, received from a user via an associated digital assistant device, to invoke the most relevant and likely candidate action(s) on the user's digital assistant device.

In some aspects, systems and techniques for generating a language model and searchable index specific to the digital assistant command-space is provided. More specifically, commands that are potentially unique to actions to be automatically performed on applications installed on a digital assistant device, such as a mobile computing device, can be better understood based on the various techniques described herein. In some further aspects, systems and techniques for generating contextually-relevant document clusters and semantic groups from an electronic document corpus can provide an optimized language model having a searchable index that is organized by high level concepts, topics, and/or sub-topics. In other words, a corpus of electronic documents for generating a language model relevant to on-boarded command templates and/or action datasets can be analyzed and organized utilizing linguistic principles of discourse communities and intertextuality to more efficiently search relevant portions of the corpus and determine the understanding of a received command.

System Overview

A computing device incorporating the "Q" digital assistant (e.g., a digital assistant device) can receive a command, which can be translated to text from a spoken command. The digital assistant device can, in some embodiments, employ services local to the user device (e.g., speech to text engine) to facilitate the conversion to text (e.g., an alphanumeric string). The digital assistant can then employ natural language processing to analyze the text for any recognized command templates stored thereon, that may be serviced by applications already-installed or required-to-be-installed by the user. In some instances, the commands may include parameters (e.g., variables) that are recognized by the digital assistant as well. In other words, a command can, in some instances, require a parameter to invoke a corresponding action (e.g., a set of application-specific operations or instructions) and achieve a specific result that is based on the provided parameter. In some aspects, the digital assistant device can facilitate the inclusion of one or more parameters into the commands associated with an action.

The text of the command can be analyzed to determine whether any command templates (with or without parameters), which may be serviced by applications already-installed or required-to-be-installed by the user, correspond thereto. Provided that an application capable to service the command is installed (or subsequently installed) on the user device, the digital assistant device then can interpret an action determined to correspond to the received command (and matching template) to automate a series of predefined tasks, which can include, by way of example only: launching the application, emulating touch inputs for button presses or application navigation, passing parameters into application form fields, waiting for application or remotely-communicated responses, and many more, until the automated "action" is fully executed and the user is provided with a result of the provided command.

As described, when the automated action is being executed by the digital assistant device, or in other words, when the various steps associated with an automated action are being performed, the various steps required to complete the action are emulated by the digital assistant. In essence, and by way of example only, the user can provide a voice command to the digital assistant, such as "get me a ride to the airport," the digital assistant can determine that a particular application can provide this service, determine a current location of the user and a nearest airport, and launch a ridesharing application that the digital assistant can pass the "current location" and "airport" parameters to. Any additional inputs, such as selection of a "submit" button also can be automated by the digital assistant, provided that such tasks are included in the predefined action corresponding to the received command.

To facilitate the creation of new actions (e.g., one or more tasks, performance of which results in achievement of a desired result), action datasets can be generated, via a digital assistant device. In accordance with embodiments described herein, a newly generated action dataset is representative of a desired action that can be invoked upon the creating user simply announcing or providing to the digital assistant device, a command corresponding to one of the commands templates associated with the action.

To facilitate distribution of action datasets created by a number of digital assistant devices, action datasets can be communicated to a central computing device (e.g., a digital assistant server) for storage and mapping to a searchable index, as will be described. While commands associated with a series of events embodying an action can be provided in any language and/or dialect that is natural to the action-creating user, it is contemplated that the action dataset should also be useful to a user of another digital assistant device speaking in other dialects or using vague or unconventional terminologies. In this regard, embodiments described herein relate to techniques for generating a language model that can be specific to the command-space of a digital assistant device, such as the "Q" Assistant, but also for generating intelligently linked document clusters that provide an improved language model for interpreting and/or understanding received commands, thereby providing digital assistant devices with determined most relevant or appropriate action datasets in response to received commands despite the dialect, vagueness, unconventional delivery, or undefined state, of the command.

In some embodiments, a "command template," as the term is utilized herein, is an alphanumeric representation of a command, or at least portions thereof, that is generally spoken or otherwise verbally provided. A received command is compared to command templates to identify corresponding actions. In some embodiments, command templates associated with an action dataset can be stored by a central computing device (e.g., a digital assistant server). The indexing of such command templates can be performed by the central computing device, so that when any one or more commands are communicated thereto (e.g., by a digital assistant device), one or more proper or most relevant action datasets can be identified and returned to the digital assistant device so that the action dataset(s) can be interpreted thereby and the corresponding tasks (e.g., operations) are performed thereon. In embodiments, the central computing device can distribute at least a portion of one or more action datasets to a plurality of other digital assistant devices having an instance of the digital assistant executing (or available for execution) thereon. In this way, any user of the plurality of computing devices simply can announce (e.g., via input or communication of one or more character strings or spoken data) a command corresponding to one of the command templates associated with the action to perform the exact same series of events and achieve the desired result on their digital assistant device.

In embodiments, a command announced by a user of one of the plurality of other digital assistant devices can be communicated in the form of an alphanumeric string to the central computing device. As such, the central computing device, upon receipt of a command, can search a language model comprising electronic documents that are each mapped to one of a plurality of stored action datasets, to identify and select at least one relevant action dataset. In this way, selected action datasets can be provided to the client device based on the command received.

An instruction to generate an action dataset can be received by a digital assistant executing on a client computing device. In some embodiments, the instruction specifies that the action dataset is to be associated with one of a plurality of applications installed on the computing device. The client computing device, by way of the digital assistant, detects a set of inputs that corresponds to the particular application and receives a set of command templates for association with the set of inputs. In some embodiments, a set of commands is received in the language of the user (e.g., the action on-boarding user), who can also identify terms within each command that are required parameters to invoke the action, if applicable. In this way, command templates can be defined by the user. It is contemplated that command templates may or may not have parameters in accordance with embodiments described herein.

In various embodiments, a digital assistant device can either store command templates and action datasets locally, or can communicate received commands to the central computing device to receive a corresponding appropriate action dataset that can be interpreted to perform the appropriate tasks. When a command is communicated to the central computing device, it can search the indexed electronic documents, each being mapped to one of a plurality of stored action datasets, to determine one or more most relevant action datasets. When one or more determined relevant action dataset is identified, the central computing device can communicate at least a portion of the one or more determined relevant action datasets to the digital assistant device for storage thereon and/or interpretation to perform the corresponding tasks. In this regard, the central computing device can identify appropriate action(s) that correspond to the received command.

There are, however, circumstances where a user provides (e.g., speaks to, inputs) an associated digital assistant device with an undefined command (e.g., a command that is vague, unclear, non-descriptive, in a strange dialect, using slang or alternative terms, or is simply undefined or unmapped to a corresponding action dataset). In this regard, embodiments herein describe techniques to generate a language model that is specific to known (e.g., defined) commands or command templates that are mapped to corresponding action datasets. The central computing device can retrieve, for each defined command or command template, relevant electronic content (e.g., from the web or a data repository) based on the command template or the terms therein. Utilizing the retrieved relevant electronic content, the central computing device can generate a highly-sophisticated language model by generating synthetic documents based on excerpts extracted from the retrieved electronic content, generate relevant document clusters based on the generated synthetic documents, intelligently link (e.g., merge) the generated document clusters to generate semantic groups of documents, and determine relevant phrases and/or concepts for the generated semantic groups. The generated language model can be employed to search received commands, such as those that are undefined, and identify action datasets that most-likely correspond to the received command. Embodiments herein thus describe techniques to facilitate the selection of relevant action datasets based on received undefined commands. In this regard, relevant action datasets can be identified and selected for distribution even for received commands that are typically uninterpretable using conventional natural language processing techniques.

When the most relevant action dataset(s) is determined and selected, the central computing device can send the determined most relevant action dataset(s) to the digital assistant device, so that the appropriate action is performed thereon or presented as a selectable option (e.g., if more than one action dataset is determined most relevant). It is further contemplated that in some further embodiments, the undefined command can also be incorporated (e.g., included) into the action dataset ultimately communicated back to the digital assistant device, for local storage and future recognition of the command at a later time. In such embodiments, it is contemplated that the digital assistant device can recognize the command from the user's digital assistant device without having to maintain a network connection to the central computing device. It is further contemplated that future modifications to the action dataset can be pushed from the central computing device to various other digital assistant devices, or retrieved by various other digital assistant devices from the central computing device.

Accordingly, at a high level and with reference to FIG. 1, an example operating environment 100 in which some embodiments of the present disclosure may be employed is depicted. It should be understood that this and other arrangements and/or features described by the enclosed document are set forth only as examples. Other arrangements and elements (e.g., machines, interfaces, functions, orders, and groupings of functions, etc.) or features can be used in addition to or instead of those described, and some elements or features may be omitted altogether for the sake of clarity. Further, many of the elements or features described in the enclosed document may be implemented in one or more components, or as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

The system in FIG. 1 includes one or more digital assistant devices 110, 115a, 115b, 115c, . . . 115n, in communication with a server 120 via a network 130 (e.g., the Internet). In this example, the server 120, also in communication with the network 130, is in communication with each of the digital assistant devices 110, 115a-115n, and can also be in communication with a database 140. The database 140 can be directly coupled to the server 120 or coupled to the server 120 via the network 130. The digital assistant device 110, representative of other digital assistant devices 115a-115n, can include a computing device comprising one or more applications 112 and a digital assistant component 114 installed and/or executing thereon.

The one or more applications 112 includes any application that is executable on the digital assistant device 110, and can include applications installed via an application marketplace, custom applications, web applications, side-loaded applications, applications included in the operating system of the digital assistant device 110, or any other application that can be reasonably considered to fit the general definition of an application or mobile application. On the other hand, the digital assistant component 114 can provide digital assistant services locally via the digital assistant device 110 or remotely provided by the server 120 via the network 130, and can be implemented at least partially into an operating system, hardware layer, or firmware of the digital assistant device 110. In accordance with embodiments described herein, the digital assistant component 114 provides an interface between a digital assistant device 110 and an associated user (not shown), generally via a speech-based exchanged, although any other method of exchange between user and digital assistant device 110 (e.g., keyboard input, communication from another digital assistant device or computing device) remains within the purview of the present disclosure.

When a speech-based input (e.g., a voice command) is detected and received by the digital assistant device 110, the digital assistant component 114 can convert the speech command to text utilizing a speech-to-text engine (not shown) to extract identified terms and generate a command. In some embodiments, the digital assistant component 114 can receive the command, and determine that the command corresponds to at least one command template of at least one action dataset stored in a memory of the digital assistant device. In some other embodiments, the digital assistant component 114 can receive the command, communicate the received command to the server 120 so that the server 120 can determine that the command corresponds to at least one command template of at least one action dataset stored in a memory accessible to the server 120, such as database 140. In this regard, the server 120 can select at least one determined corresponding action dataset and communicate it to the digital assistant component 114 for interpretation thereby. In some embodiments, the digital assistant component 114 and/or server 120 can generate an index of all stored command templates for faster searching and comparison of the received command, to identify a relevant and/or corresponding command template, and thereby select a relevant and/or corresponding action dataset. Each indexed command template can be mapped to a corresponding action dataset, which can be interpreted by the digital assistant component 114 for execution based on a determined match between the received command and a command template and/or a selection of a command template based on a determined relevance to the received command.

By way of brief overview, a command template can include one or more keywords and/or one or more parameters that each have a corresponding parameter type. Each command template generally corresponds to an operation that can be performed on one or more applications 112 installed on a digital assistant device 110. Moreover, a plurality of command templates can correspond to a single operation, such that there are multiple equivalent commands that can invoke the same operation. By way of example only, commands such as "check in," check into flight," "please check in," "check into flight now," "check in to flight 12345," and the like, can all invoke the same operation that, by way of example only, directs the digital assistant component 114 to execute an appropriate airline application on the digital assistant device 110 and perform a predefined set of events or computer operations to achieve the same result.

The aforementioned commands, however, may lack appropriate information (e.g., the specific airline). As one of ordinary skill may appreciate, a user may have multiple applications 112 from various vendors (e.g., airlines) associated with a similar service (e.g., checking into flights). A digital assistant device 110 in accordance with embodiments described herein can provide features that can determine contextual information associated with the digital assistant device 110, or its associated user, based on historical use of the digital assistant device 110, profile information stored on the digital assistant device 110 or server 120, stored parameters from previous interactions or received commands, indexed messages (e.g., email, text messages) stored on the digital assistant device, and a variety of other types of data stored locally or remotely on a server, such as server 120, to identify a most relevant parameter and supplement a command to select a most relevant action dataset. More specific commands, such as "check into FriendlyAirline flight," or "FriendlyAirline check in," and the like, where a parameter is specifically defined in the command, can be recognized by the digital assistant component 114.

One or more recognizable commands and corresponding action datasets can be received by the digital assistant device 110 from the server 120 at any time, including upon installation, initialization, or invocation of the digital assistant component 114, after or upon receipt of a speech command by the digital assistant component 114, after or upon installation of a new application 112, periodically (e.g., once a day), when pushed to the digital assistant device 110 from the server 120, among many other configurations. It is contemplated that the action datasets received by the digital assistant device 110 from the server 120 can be limited based at least in part on the applications 112 installed on the digital assistant device 110, although configurations where a larger or smaller set of action datasets received are contemplated.

In some embodiments, in the event an action dataset is determined not available for a particular application 112 installed on the digital assistant device 110, digital assistant component 114 can either redirect the user to a marketplace (e.g., launch an app marketplace application) to install the appropriate application determined by the server 120 based on the received command, or can invoke an action training program that prompts a user to manually perform tasks on one or more applications to achieve the desired result, the tasks being recorded and stored into a new action dataset by the digital assistant device 110. The digital assistant component 114 can also receive one or more commands from the user (e.g., via speech or text) to associate with the action dataset being generated. If the command includes variable parameters (e.g., optional fields), the action training program can facilitate a definition of such parameters and corresponding parameter types to generate command templates for inclusion in the action dataset being generated. In this way, a command template(s) is associated with at least the particular application designated by the user and also corresponds to the one or more tasks manually performed by the user, associating the generated command template to the task(s) and thus the desired resulting operation.

In some embodiments, the server 120 can provide one or more determined most-relevant action datasets to the digital assistant device 110 based on the received command communicated to the server 120. As described, the server 120 can store and index a constantly-growing and evolving plurality of crowd-sourced action datasets submitted by or received from any of digital assistant devices 115a-115n also independently having a digital assistant component 114 and any number of applications 112 installed thereon. The digital assistant devices 115a-115n may have any combination of applications 112 installed thereon, and any generation of action datasets performed on any digital assistant device 110, 115-115n can be communicated to the server 120 to be stored and indexed for mass or selective deployment, among other things. In some aspects, the server 120 can include any variety of search engines, relevance engines, and/or machine-learned algorithms to provide a level of quality assurance on command templates included in on-boarded action datasets and/or the tasks and operations performed before they are distributed to other digital assistant devices via the network 130.

When the digital assistant component 114 either locally selects or receives, from server 120, a determined relevant action dataset based on the command, the digital assistant component 114 can generate an overlay interface that can mask any or all visual outputs associated with the determined action or the computing device, generally. The generation of the overlay interface can include a selection, by the digital assistant component 114, of one or more user interface elements that are stored in a memory of the digital assistant device 110 or server 120, and/or include a dynamic generation of the user interface element(s) by the digital assistant component 114 or server 120 based on one or more portions of the received command, command, and/or obtained contextual data (e.g., determined location data, user profile associated with the digital assistant device 110 or digital assistant component 114, historical data associated with the user profile, etc.) obtained by the digital assistant device 110, digital assistant component 114, and/or server 120. The selected or generated one or more user interface elements can each include content that is relevant to one or more portions (e.g., terms, keywords) of the received command. In the event of dynamic generation of user interface elements, such elements can be saved locally on the digital assistant device 110 or remotely on the server 120 for subsequent retrieval by the digital assistant device 110, or can be discarded and dynamically regenerated at any time.

Example operating environment depicted in FIG. 1 is suitable for use in implementing various embodiments of the invention. Generally, environment 100 is suitable for creating, on-boarding, storing, indexing, crowd-sourcing, selecting, distributing, and invoking action datasets that are interpretable to perform a corresponding set of tasks or operations on a digital assistant device 110. Environment 100 includes digital assistant device 110, digital assistant server 120 (hereinafter also referenced as "server" or "digital assistant server") and network 130. Digital assistant device 110 can be any kind of computing device having a digital assistant component 114 installed in and/or executing thereon. For example, in an embodiment, digital assistant device 110 can be a computing device such as computing device 1800, as described below with reference to FIG. 18. In various embodiments, digital assistant device 110 can be a personal computer (PC), a laptop computer, a workstation, a mobile computing device, a PDA, a cell phone, a smart watch or wearable, or the like. A digital assistant device 110 can include one or more applications 112 installed and executable thereon. The one or more applications 112 can include any application that is executable on the digital assistant device 110, and can include applications installed via an application marketplace, custom applications, web applications, side-loaded applications, applications included in the operating system of the digital assistant device 110, or any other application that can be reasonably considered to fit the general definition of a software application. On the other hand, the digital assistant component 110 can include an application, a service accessible via an application installed on the digital assistant device 110 or via the network 130, or implemented into hardware, firmware, or a layer of an operating system of the digital assistant device 110. In accordance with embodiments described herein, the digital assistant component 114 can provide an interface between a digital assistant device 110 and a user (not shown), generally via a speech-based exchange, although any other method of exchange between user and digital assistant device may be considered within the purview of the present disclosure.

Similarly, digital assistant server 120 ("server") can include any kind of computing device comprising components capable of facilitating the on-boarding, storage, management, indexing, searching, relevance determination, and distribution of crowd-sourced action datasets. For example, in an embodiment, digital assistant server 120 can be a computing device such as computing device 1800, as described below with reference to FIG. 18. In some embodiments, digital assistant server 120 comprises one or more server computers, distributed or otherwise. Generally, any of the components of environment 100 may communicate with each other via a network 130, which may include, without limitation, one or more local area networks (LANs) and/or wide area networks (WANs). Such networking environments are commonplace in offices, enterprise-wide computer networks, intranets, and the Internet. The digital assistant server 120 can include or be in communication with one or more data sources 140, which may comprise data sources and/or data systems, configured to make data available to any of the various constituents of the operating environment 100. Data source(s) 140 may be discrete from the illustrated components, or any combination thereof, or may be incorporated and/or integrated into at least one of those devices or components.

The Digital Assistant Device

Figure 2:
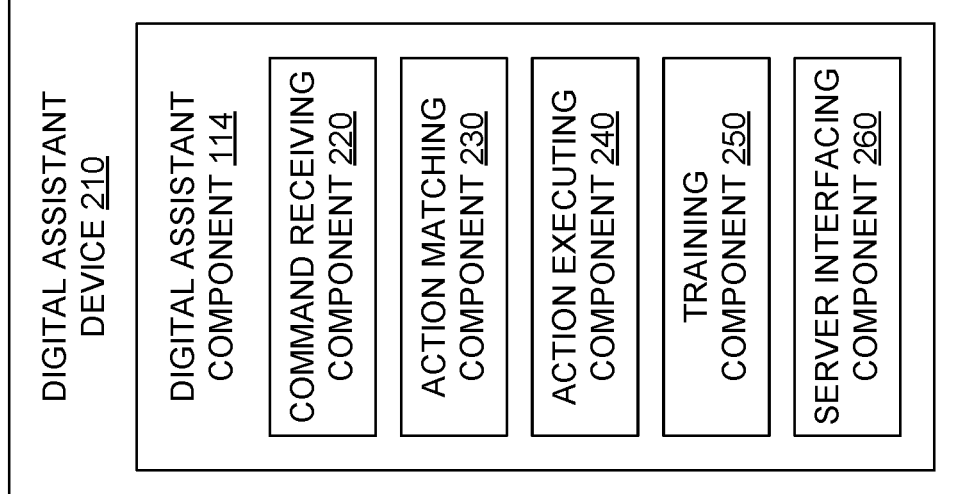
FIG. 2. is a block diagram illustrating an exemplary digital assistant device in accordance with some embodiments of the present disclosure.

Referring now to FIG. 2, a block diagram 200 of an exemplary digital assistant device 210 suitable for use in implementing embodiments of the invention is shown. Generally, digital assistant device 210 (also depicted as digital assistant device 110 of FIG. 1) is suitable for detecting speech-based commands, converting the speech-based commands to commands in text-based form, receiving the commands, selecting action datasets to execute by matching the received commands to command templates of action datasets, determining that no locally-stored action datasets correspond to received commands, interpreting a selected or received action dataset to execute the associated operation, generating new action datasets, and sending action datasets to or receiving action datasets from a digital assistant server, such as server 120 of FIG. 1.

Digital assistant device 210 can include, among other things, a command receiving component 220, an action matching component 230, an action executing component 240, a training component 250, and a server interfacing component 260. The command receiving component 220 can receive a command, either in the form of speech data or text data. The speech data can be received via a microphone (not shown) of the digital assistant device 210, or another computing device paired to or in communication with the digital assistant device 210. The command receiving component 220, after receiving the speech data, can employ a speech-to-text engine of the digital assistant device 210 to generate a command (e.g., an alphanumeric string corresponding to the received speech data). As will be referred to herein, a command generated based on received speech data can be interpreted as a command being received. Text data received by command receiving component 220, on the other hand, can be received via a virtual keyboard or other input method of the digital assistant device 210, or via a network from another computing device paired to or in communication with the digital assistant device 210. Received text data can already be in the form of a command, and can be treated as such. In various embodiments, command receiving component 210 can be invoked manually by a user (e.g., via a received input to begin listening for or receiving the speech or text-based command), or can be in an always-listening or always-receiving mode.

Based on a command being received by command receiving component 220, action matching component 230 can determine whether one or more action datasets stored on the digital assistant device 210 include a command template that corresponds to or substantially corresponds (e.g., at least 90% similar) to the received command. In some aspects, a corresponding command template can be identified, and the action dataset of which the corresponding command template is stored in, can be selected for interpretation by action executing component 240. In some other aspects, a corresponding command template cannot be identified, and either the training component 250 can be invoked, or the received command can be communicated to the digital assistant server (depicted as server 120 of FIG. 1 and digital assistant server 302 of FIG. 3) via the server interfacing component 260.

The action executing component 240 can receive an action dataset that corresponds to or is determined relevant to the received command, selected by digital assistant device 210 from local storage or selected by the digital assistant server from storage accessible thereto. In some aspects, if two or more action datasets are determined equally or closely relevant to the received command, a list including the determined relevant action datasets can be provided for display by digital assistant device 210, such that an input corresponding to one of the listed action datasets can indicate a selection of one desired action dataset. The action executing component 240 can, employing the received and/or selected action dataset, interpret included event data, which may include interpretable instructions, executable code, links, deep links, references to GUI elements, references to screen coordinates, field names, or other pieces of data that can correspond to one or more reproducible operations, tasks, or events associated with the selected action dataset. When the event data is interpreted, the action executing component 240 can reproduce the operations that were recorded when the action dataset was initially generated by any computing device, such as digital assistant device 210. In some aspects, the event data can include time delays, URLs, deep links to application operations, or any other reproducible operation that can be accessed, processed, emulated, or executed by the action executing component 240. In some aspects, events such as clicks or touch inputs, can be reproduced on the digital assistant device 210, based on the interpreted event data stored in the invoked action dataset.

The training component 250 can facilitate the generation of an action dataset, among other things. When the training component 250 is invoked, an indication, such as a GUI element, indicating that an action recording session has begun may be presented for display. A prompt to provide the tasks or events required to perform the desired operation can also be presented for display. In this regard, a user can begin by first launching an application for which the operation is associated with, and proceed with providing inputs to the application (i.e., (performing the requisite tasks). The inputs can be recorded by the digital assistant device 210, and the training component 250 can listen for, parse, identify, and record a variety of attributes of the received inputs, such as long or short presses, time delays between inputs, references to GUI elements interacted with, field identifiers, application links activated based on received inputs (e.g., deep links), and the like. The recorded inputs and attributes (e.g., event data) can be stored, sequentially, in an event sequence, and stored into a new action dataset. The application launched is also identified, and any application identifying information, such as operating system, operating system version, application version, paid or free version status, and more, can be determined from associated metadata and also stored into the new action dataset. When the desired operation is completed (i.e., all requisite tasks/events performed), a user can activate a training termination button, which can be presented as a floating button or other input mechanism that is preferably positioned away from an active portion of the display. Other termination methods are also contemplated, such as voice activated termination, or motion activated termination, without limitation.

The training component 250 can further request that the user provide a set of commands that correspond to the desired operation. A command can be received via speech data and converted to a command by a speech to text engine, or received via text input as a command, among other ways. When the set of commands is provided and stored as commands, the training component 250 can further prompt the user to define any relevant parameters or variables in the commands, which can correspond to keywords or values that may change whenever the command is spoken. In this regard, a user may select one or more terms included in the received commands, and define them with a corresponding parameter type selected from a list of custom, predefined, or determined parameter types, as described herein. The training component 250 can then extract the selected one or more terms from a command defined as parameter(s), replacing them with parameter field identifier(s) of a corresponding parameter type, and store the resulting data as a command template. The training component 250 can then generate the action dataset from the recorded event sequence, the application identifying information, and the one or more defined command templates. In some embodiments, the training component 250 can generate an action signature or unique hash based on the generated action dataset or one or more portions of data included therein. The action signature can be employed by the digital assistant server to determine whether the action dataset or data included therein is redundant, among other things.

The server interfacing component 260 can communicate received commands, generated action datasets, contextual information, or any other data obtained by digital assistant device 210. Similarly, the server interfacing component 260 can receive code, updates, instructions, command templates, action datasets, or any other data from a digital assistant server, such as digital assistant server 120 of FIG. 1. In this regard, the server interfacing component 260 can employ a network, such as network 130 of FIG. 1, to facilitate communicates to and from a digital assistant server.

The Digital Assistant Server

Figure 3:
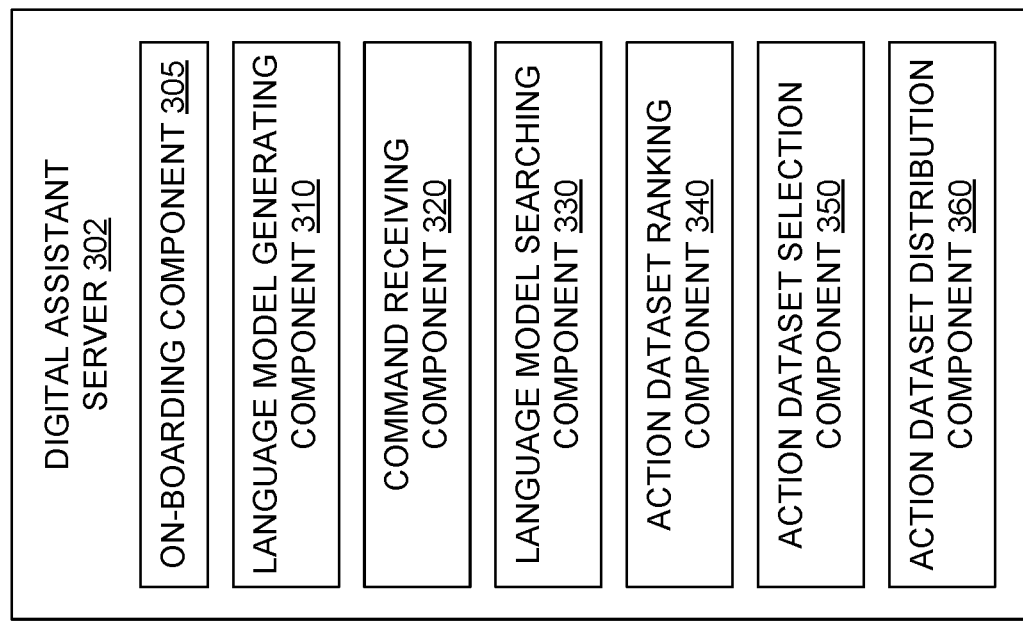
FIG. 3 is a block diagram illustrating an exemplary digital assistant server in accordance with some embodiments of the present disclosure.

Looking now to FIG. 3, a block diagram 300 of an exemplary digital assistant server 302 suitable for use in implementing embodiments of the invention is shown. Generally, digital assistant server 302 (also depicted as server 120 of FIG. 1) is suitable for establishing connections with digital assistant devices, such as digital assistant device 210 of FIG. 2; receiving generated action datasets from the digital assistant devices; receiving commands from one or more digital assistant devices; generating, maintaining, and employing language models for interpreting commands received from the digital assistant devices; maintaining or indexing received and stored action datasets; searching commands, command templates, and action datasets maintained and/or stored in memory; determining relevance of searched commands, command templates, and action datasets; and distributing selected and determined relevant action datasets to the digital assistant devices. Digital assistant server 302 can include, among other things, an on-boarding component 305, a language model generating component 310, a command receiving component 320, a language model searching component 330, an action dataset ranking component 340, an action dataset selection component 350, and an action dataset distribution component 360, among other things.

The on-boarding component 305 can receive action datasets generated by one or more digital assistant devices 210 in communication with digital assistant server 302, and store them in a memory or database, such as database 140 of FIG.

1. In some aspects, the on-boarding component can either determine an action signature from a received action dataset or generate an action signature for a received action dataset, similar to how a digital assistant device may, as described herein above. Before storing the received action dataset, the action signature can be employed to generate a query that searches a maintained index of all action datasets stored by the digital assistant server 302. In this way, the action signatures facilitate quick determination of uniqueness of received action datasets, and reduces redundancy and processing load of the digital assistant server 302. The on-boarding component 305 can also determine whether any portion of a received action dataset is different than action datasets already stored on or by the server (e.g., in a database), and extract such portions for merging into the existing corresponding action datasets. Such portions may be identified in circumstances where only command templates are hashed in the action signature, or where each portion of the action dataset (e.g., application identifying information, command template(s), event sequence) is independently hashed either by training component 240 of FIG. 2 or on-boarding component 310 of FIG. 3, to more easily identify changes or differences between action datasets. By way of example, in some embodiments, a received action dataset can include separate hashes for its application identifying information, event sequence, and command template (s). In this regard, the on-boarding component 305 can quickly identify that the received action dataset corresponds to a particular application and operation, or that the command template(s) are different than those stored in the stored action dataset by virtue of the command template hashes being different. Similarly, the independent hash signatures for each portion of data included in an action dataset can facilitate efficient determination of changes or differences between any combination of data portions in a received action dataset and a stored action dataset.

The digital assistant server 302 can also include a language model generating component 310, which can be employed to efficiently generate an intelligent language model specific to a desired language space, such as commands received from a digital assistant device. As will be further described in accordance with FIGS. 5-12, the language model generating component can include components for generating, developing, maintaining, and/or employing a more sophisticated and relevant language model to understand context and meaning of a received command, such as those received from digital assistant devices, with minimal to no training intervention. In some embodiments, language model generating component 310 can obtain (e.g., extract), from the action datasets stored by digital assistant server 302, a plurality of command templates or at least portions thereof (e.g., with or without parameter fields). By virtue of each stored action dataset including corresponding command templates, each obtained command template can be mapped to one of the stored action datasets. For each obtained command template, language model generating component 310 can generate an associated set of synthetic documents based on a determined relevant set of electronic documents (e.g., webpages, social media feeds, PDFs, Internet forum entries) retrieved from at least one remote data repository, such as a website or other electronic document database accessible to the digital assistant server 302 via a network. Each synthetic document of the generated sets of synthetic documents can then be modified by language model generating component 310 to include a tag or title that corresponds to the associated command template. In this way, each command template mapped to a corresponding action dataset can also be associated with a generated set of synthetic documents.

In some aspects, the language model generating component 310 can generate a plurality of document clusters based on the modified synthetic documents, thereby providing a command-specific language model. In some embodiments, the language model generating component 310 can employ techniques for generating document clusters described in U.S. Pat. No. 7,747,593 (the '593 patent), titled "Computer Aided Document Retrieval," the entire contents of which is herein incorporated by reference. In some further aspects, language model generating component 310 can employ advanced linguistic concepts of discourse communities and intertextuality to strategically link (e.g., merge) the generated document clusters and thereby generate more enriched and relevant sets of documents (i.e., semantic groups of documents) that can provide an improved and more efficient language model employable for purposes of automated command interpretation.

In some further aspects, language model generating component 310 can analyze the generated semantic groups of documents to determine representative phrases (e.g., topics or concepts) corresponding to each generated semantic group. The language model generating component 310 can then generate a mapping of the representative phrases to the generated semantic groups, thereby organizing the generated semantic groups into more relative topics or general concepts that are communicated throughout the documents within each semantic group. As will be described, these representative phrases can be employed to quickly identify document clusters that are relevant to a received command, for purposes of employing the documents within the cluster to interpret a received command.

Moving on, and as briefly described in accordance with FIG. 2, a digital assistant device 210 can communicate, via a network, a received command to the digital assistant server 302. In this regard, the digital assistant server 302 can include a command receiving component 320 that facilitates establishing the remote connection with the digital assistant device 210, and receiving the command from the digital assistant device 210. As was described, a command can include a text-based (e.g. alphanumeric) string that can include terms, keywords, parameters, and the like, for purposes of initiating an action (e.g., task or series of tasks) on the digital assistant device 210.

The digital assistant server 302 can also include a language model searching component 330 that can generate a query for purposes of searching a language model accessible to the digital assistant server 302, such as one generated by language model generating component 310. More specifically, the language model searching component 330 can employ the received command to perform a semantic-based search on the one or more generated synthetic documents of the language model generated by language model generating component 310. As was noted herein, the received command can be defined (e.g., one that directly or partially corresponds to a command template included in one of the stored plurality of action datasets), or can be undefined (e.g., vague, unclear, difficult to interpret). Provided that the language model generating component 310 has generated the language model based on the command templates included in the stored plurality of action datasets, the language model searching component 330 can generate a query employing the command, whether defined or undefined, and accurately determine a meaning or intention of the received command to select an appropriate action dataset. Thus, the language model searching component 330 can generate a query that includes at least a portion of the received command, and employ a search algorithm or search engine to identify representative phrases of the various semantic groups that correspond to the generated query. In this regard, the scope of generated synthetic documents in the language model can be immediately narrowed based on a determined relevance to the received command. The language model searching component 330 can further traverse one or more semantic groups of the language model having representative phrases relevant to the received command, to identify the generated synthetic documents that are determined relevant to the received command.

As each of the generated synthetic documents have been modified to include a tag or title that corresponds to one of the obtained plurality of command templates, and by virtue of each command template being mapped to one of the stored plurality of action datasets, any subset of generated synthetic documents can correspond to a particular subset of the stored plurality of action datasets. Provided the foregoing, when a set of generated synthetic documents are determined relevant to the received command, a corresponding subset of the stored plurality of action datasets can also be identified.

In some embodiments, language model searching component 330 can employ an action dataset ranking component 340 of the digital assistant server 302. The action dataset ranking component 340 can include and access a defined set of rules, employable by the language model searching component 330, to assign scores to each search result (e.g., action dataset), indicating its relative priority or relevance to a received command. These scores can be included in a "modifier" of a corresponding search result (e.g., action dataset), which enables the action dataset ranking component 340 to rank the potential action dataset with respect to other candidate potential action datasets included in the plurality of search results. In this regard, a ranking of relevant action datasets can be determined, from most relevant to least relevant. In some aspects, contextual data obtained by and received from the digital assistant device, from which the command was received, can be employed by the action dataset ranking component 340 to further modify scores of various search results. In some aspects, a threshold number and/or a threshold score can be defined to determine a maximum number of relevant search results. It is also contemplated that some of the assigned scores can be the same, indicating a determination of equal relevance to a received command. Additional detail relating to the determination of relevance and assigning scores to action datasets can be found in U.S. patent application Ser. No. 16/047,782, titled "Ranking and Boosting Relevant Distributable Digital Assistant Operations," which is assigned or under obligation of assignment to the same entity as this application, the entire contents of each application being herein incorporated by reference.

The digital assistant server 302 can also include an action dataset selection component 350 that selects one or more of the action datasets, included in the set of action datasets in the search result generated by language model searching component 330 and/or ranked by action dataset ranking component 340, having a highest assigned score (i.e., determined most relevant to the received command). As was noted herein, in some embodiments, multiple action datasets can be assigned a common highest ranked score. In this regard, action dataset selection component 350 can select one or more action datasets from the ranked set of search results having a highest score.

The digital assistant server 302 can further include an action dataset distribution component 360 to distribute or communicate, to a digital assistant device 210 from which a command was received, a set of action datasets determined most relevant to the received command. The action dataset distribution component 360 can retrieve the selected one or more determined most relevant action datasets from a memory or database, such as database 140 of FIG. 1, establish a communications session with the digital assistant device 210 from which the command was received, and/or communicate the selected one or more determined most relevant action datasets to the digital assistant device 210 as a response to the received command. In this way, the digital assistant device 210 from which the command was received can interpret the communicated action dataset, and execute the corresponding action or set of tasks defined thereby. As described in accordance with FIG. 2, if more than one action dataset is selected and communicated to the digital assistant device 210, a prompt can be provided for display by the digital assistant device 210 to select for interpretation one of the determined most relevant action datasets communicated thereto.

In various embodiments, action dataset distribution component 360 can distribute or communicate to a digital assistant device 210, a set of action datasets determined most relevant to a command received from the digital assistant device 210, new action datasets stored by the digital assistant server 302, determined updated action datasets, any portion and/or combination of the foregoing, and/or generated notifications corresponding to any portion and/or combination of the foregoing, among other things based on a variety of factors. For instance, the distribution component 360 can include features that determine, among other things, which applications are installed on a digital assistant device 210. Such features can enable the digital assistant server 302 to determine which action datasets or portions thereof are relevant to the digital assistant device 210, and should be distributed to the digital assistant device 210. For instance, a digital assistant device 210 profile (not shown) describing all applications currently installed or executable by a digital assistant device 210, can be maintained (e.g., stored, updated) by the digital assistant server 302. The profile can be updated periodically, manually, or dynamically by a server interfacing component 260 of the digital assistant device 210 (e.g., whenever the digital assistant is in communication with and sends a command to the digital assistant server 302, or whenever an application is installed or updated on the digital assistant device 210). The distribution component 360 can distribute or communicate notifications, action datasets, or portions thereof, in a variety of ways, such as pushing, sending in response to received requests for updates, sending in response to established communications with a digital assistant device 210, or by automatic wide scale (e.g., all digital assistant devices) or selective scale (e.g., region, location, app type, app name, app version) distribution, among other things.

The Action Dataset

Figure 4:
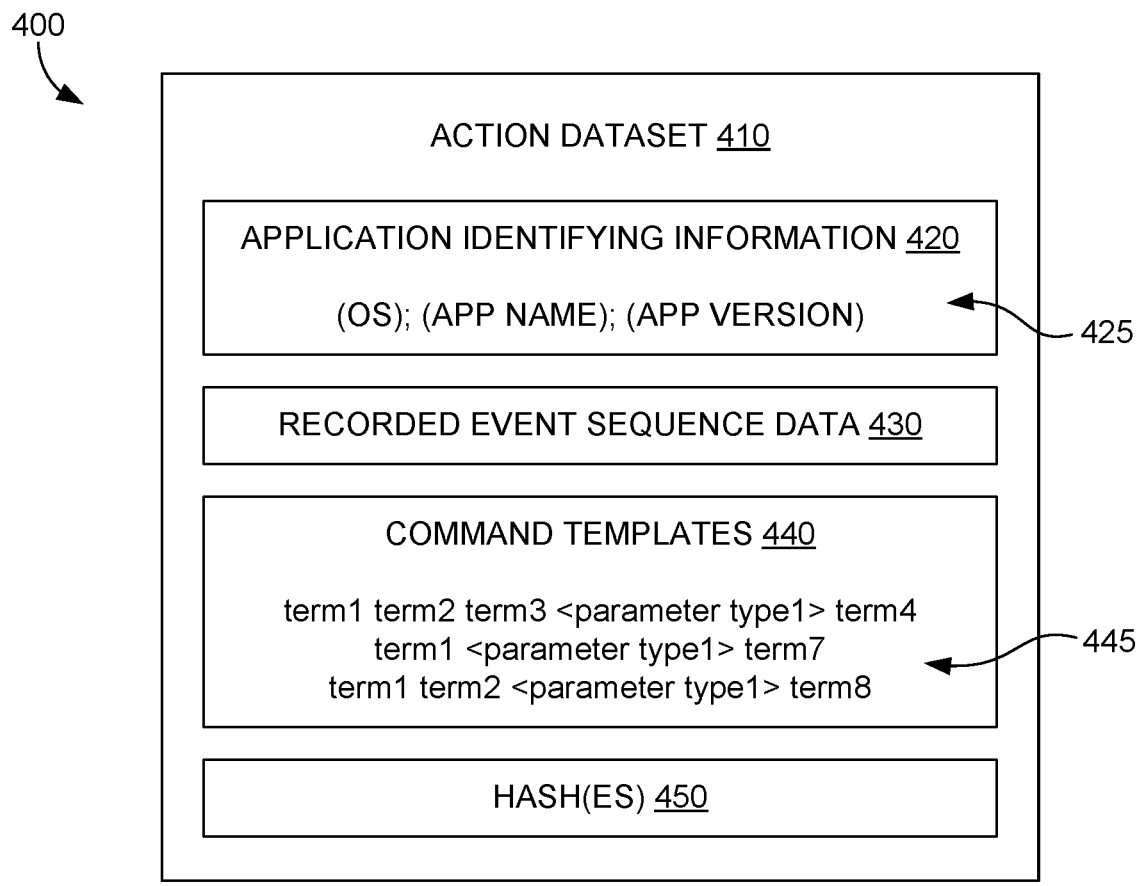
FIG. 4 is a block diagram illustrating an exemplary action dataset in accordance with some embodiments of the present disclosure.

Turning now to FIG. 4, a block diagram 400 of an exemplary data structure corresponding to an action dataset 410 in accordance with some of the described embodiments is illustrated. The depicted data structure is not intended to be limiting in any way, and any configuration of the depicted data portions of information may be within the purview of the present disclosure. Further, additional data portions or less data portions may be included in an action dataset 410 also remaining within the purview of the present disclosure.

In the depicted data structure 400, the action dataset 410 includes application identifying information 420, recorded event sequence data 430, and command templates 440. In some embodiments, the action dataset 410 further includes hash(es) 450, which can include a hash value generated based on the entire action dataset 410, or hash values generated based on any portion of the aforementioned data portions 420, 430, 440, among other things. The action dataset 410 can be generated by training component 250 of digital assistant device 210 of FIG. 2 and/or received from action dataset distribution component 360 of digital assistant server 302 of FIG. 3.

The application identifying information 420 can include information about a particular application that is required for execution to perform a particular operation for which the action dataset 410 was created. Exemplary pieces of application identifying information 420 are depicted in identifying information 425, which can include any one or more of an operating system (OS) name for which the particular application is executed on, an OS version of the aforementioned OS, a defined native language of the aforementioned OS, a name of the particular application, a version of the particular application, and the like. It is contemplated that the application identifying information 420 is required and checked (e.g., by the digital assistant server 302 of FIG. 3), before an action dataset 410 is distributed to a digital assistant device (e.g., digital assistant device 210 of FIG. 2) and employed by the digital assistant device to ensure that the action dataset 410 is compatible with, or can be correctly interpreted by action executing component 240 of FIG. 2, so that the corresponding and desired operation is performed by the digital assistant device 210.

The recorded event sequence data 430 can include any or all task or event-related data that was obtained, received, or determined by the digital assistant device (e.g., via training component 250 of FIG. 2) responsible for generating the action dataset 410. As noted herein, the recorded event sequence data can include timing attributes of received inputs (e.g., delays before or in between successive inputs, duration of inputs, GUI elements interacted with, relative positions of GUI elements, labels or metadata of GUI elements, scroll inputs and distances, links or URLs accessed activated, detected activation of application deep links activated in response to received inputs, and more). In some instances, the recorded event sequence data 430 may include conditions that require actual user intervention before subsequent events or tasks are resumed. For instance, secured login screens may require that a user input username and password information before an application is executed. In this regard, the recorded event sequence data 430 may include a condition corresponding to when user authentication has occurred, and instructions (e.g., interpretable by action executing component 240) to proceed with the tasks or events in the recorded event sequence data 430 based upon an occurrence of the condition. In various implementations, it is contemplated that the action executing component 240 of FIG. 2 can parse metadata, GUI elements, or other information from an executing application to determine when certain events occur or conditions are met. In this regard, additional conditions may be included in the recorded event sequence data 430 that require prior events or tasks to be completed, or certain GUI elements be displayed or interacted with, or any other conditions to be met, before subsequent events or tasks are performed by the action executing component 240 of FIG. 2.

Generating the Language Model

Figure 5:
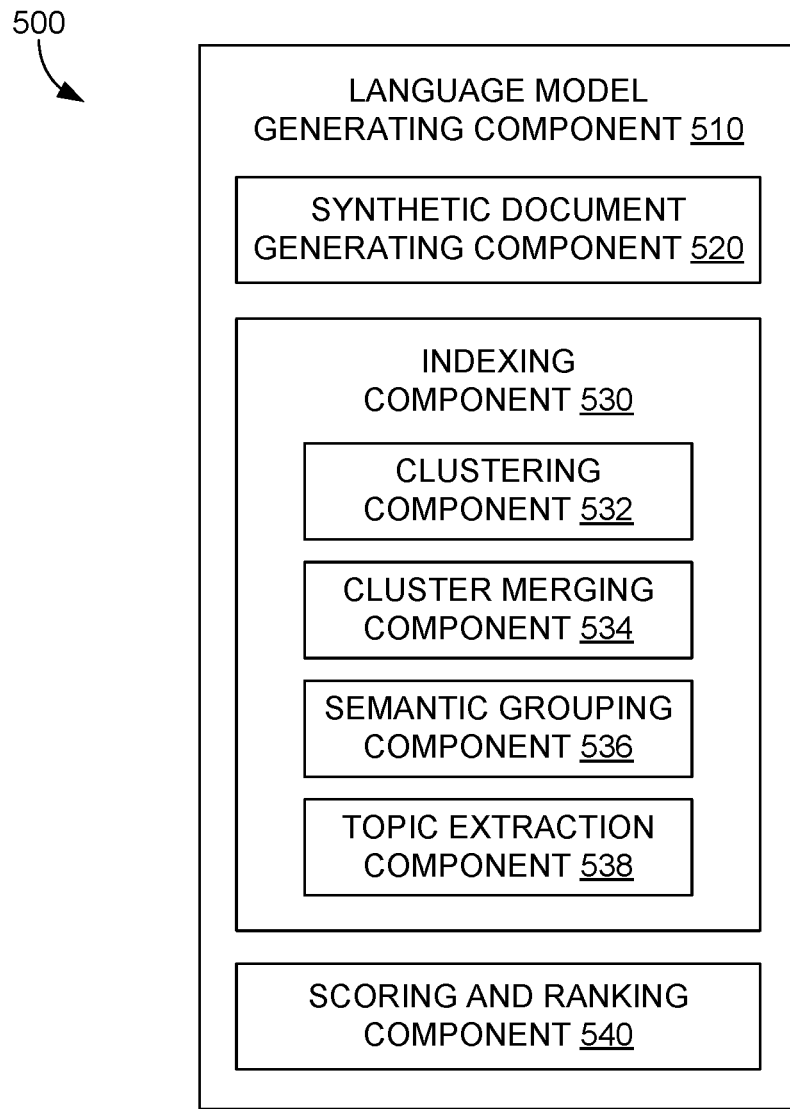
FIG. 5 is a block diagram illustrating an exemplary language model generating component in accordance with some embodiments of the present disclosure.
Figure 6:
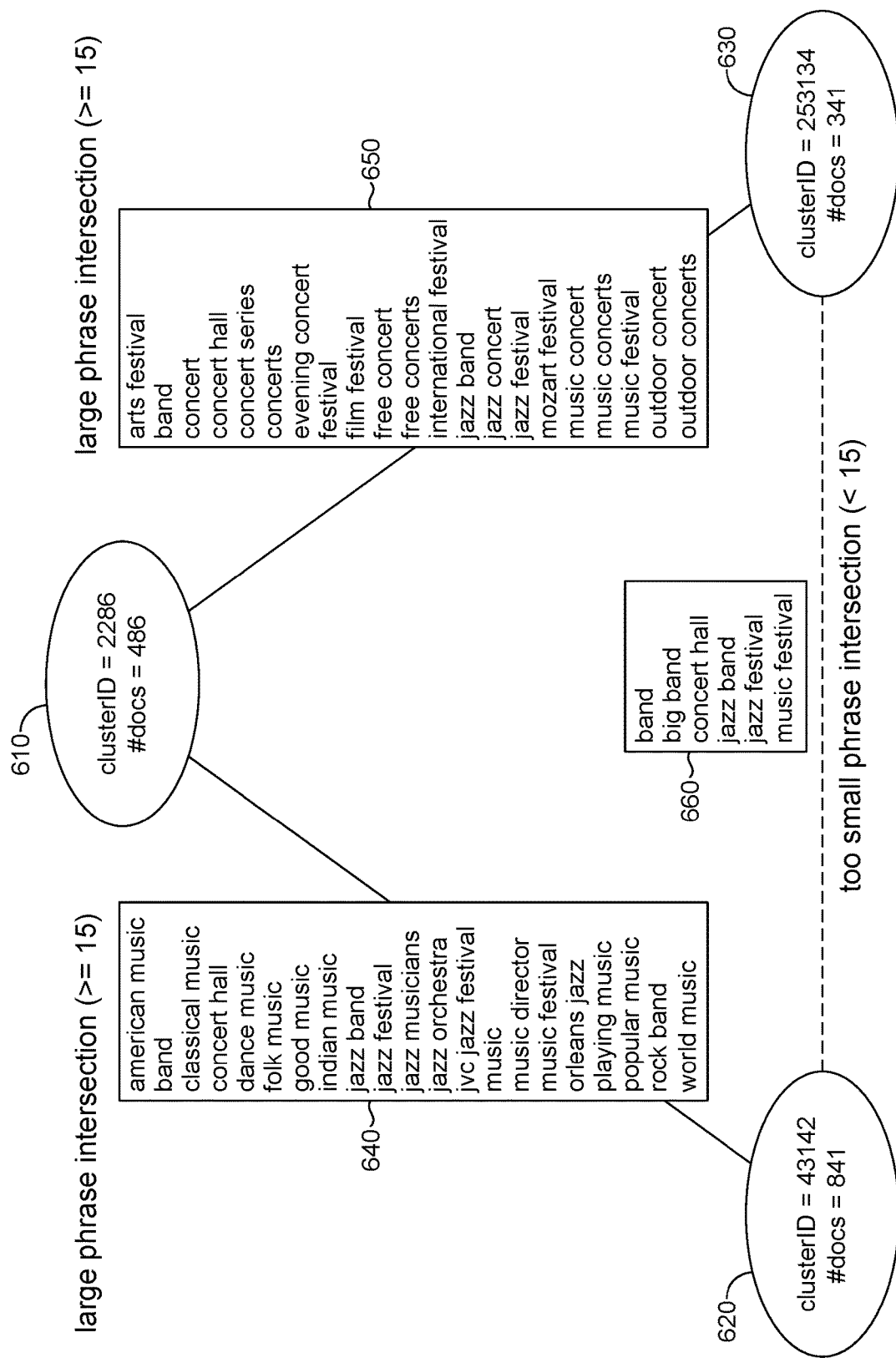
FIGS. 6-8 are relational diagrams illustrating relationships between document clusters in accordance with some embodiments of the present disclosure.
Figure 7:
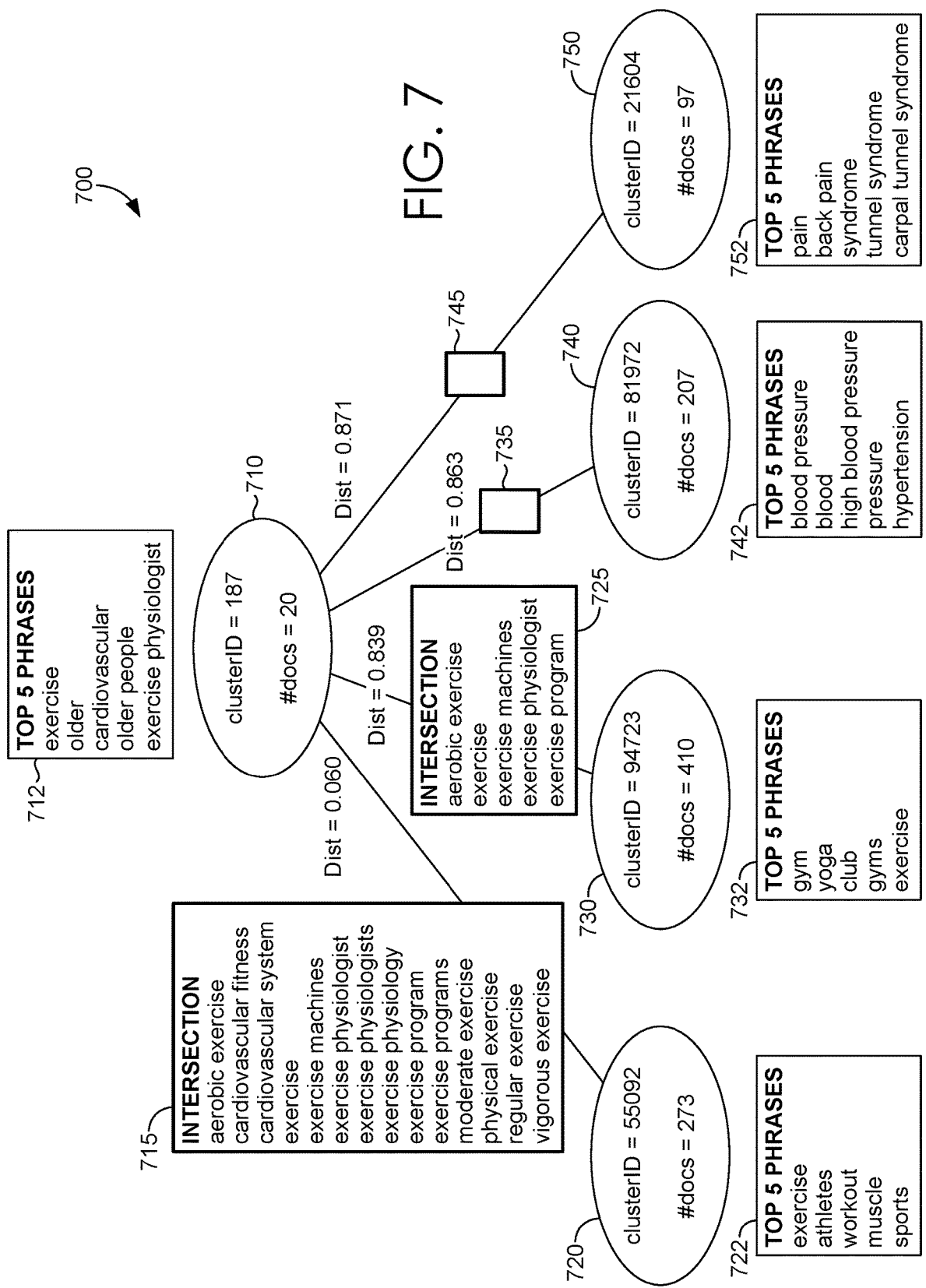

Turning now to FIG. 5, a block diagram 500 is provided, depicting an exemplary language model generating component 510 in accordance with some of the described embodiments. The language model generating component 510, also described in accordance with language model generating component 310 of FIG. 3, can be employed to efficiently generate an intelligent language model specific to a desired language space, such as commands received from a digital assistant device. The language model generating component 510 can include a synthetic document generating component 520 for generating and modifying a corpus of electronic documents that is relevant to the command space, an indexing component 530 for organizing the corpus of electronic documents and generating an index thereof, for more efficiently searching the documents based on received commands, and a scoring and ranking component 540 that can be employed by the indexing component 530, among other things, to facilitate the organization of the corpus based on linguistic principles of intertextuality, among other things.

As was described in accordance with language model generating component 310 of FIG. 3, a digital assistant server, such as digital assistant server 302, can have a plurality of action datasets stored thereon. Each of the stored action datasets can include a corresponding set of command templates that can be matched to or determined relevant to a received command. The digital assistant server can receive a command from a digital assistant device, such as digital assistant device 210 of FIG. 2, interpret the received command to determine whether the received command matches or is relevant to one of the command templates corresponding to one of the stored action datasets, and distribute the stored action dataset determined to match or be most relevant to the received command.

As one of ordinary skill may appreciate, the digital assistant server 302 must have a corpus of electronic documents that it can analyze to facilitate various underlying natural language processing techniques. In order to generate a language model that is based on terms or phrases that are more relevant to the command space, or in other words to facilitate a better understanding of commands received by a digital assistant device to invoke a corresponding set of tasks via one or more installed applications, it would be beneficial to build the language model with a corpus of electronic documents that have terms and phrases relevant to the command space. As such, the synthetic document generating component 520 can obtain (e.g., extract, retrieve) a plurality of command templates or at least portions thereof (e.g., with or without parameter fields) based on the action datasets stored by digital assistant server 302. For each of the command templates, the synthetic document generating component 520 can generate a query including at least a portion of the command template, and submit the query to a search engine or remote data repository to retrieve a corresponding search result. The search result for the query can include a plurality of electronic documents, such as content from webpages, social media feeds, PDFs, Internet forum entries, and the like. As the electronic documents were retrieved based on one of the command templates, it is contemplated that the electronic documents were determined at least partially relevant to the command template or terms included therein.

The synthetic document generating component 520 can extract, from at least a portion of the retrieved search results, one or more portions (e.g., sentences) that are determined relevant to the generated query (e.g., the command template). By way of non-limiting example, the synthetic document generating component 520 can employ a search engine to identify excerpts (e.g., 20-30) of at least a portion of the electronic documents included in the search result determined randomly, or including terms or portions of the command template or determined relevant thereto, and extract the identified portions. The extracted excerpts can be employed by the synthetic document generating component 520 to generate a plurality of synthetic documents corresponding to the command template, each generated synthetic document including any portion of the extracted excerpts. In some aspects, a defined number of extracted excerpts can be included in a single synthetic document generated for a corresponding command template. In some further aspects, a defined number (e.g., 100) of synthetic documents can be generated for a corresponding command template.

With each command template having a corresponding plurality of synthetic documents generated by the synthetic document generating component 520, a corpus of electronic documents comprising all generated synthetic documents is generated. In this way, the corpus of electronic documents specific to the command space is automatically generated, each of the electronic documents within the generated corpus being relevant to at least a portion of the command space. The synthetic document generating component 520 can further modify each synthetic document generated for a corresponding command template by adding a title or tag to the generated synthetic document. The title or tag can include or reference the command template, so that the generated synthetic document can be identified based on the command template to which it corresponds.

The indexing component 530 can be employed by the language model generating component 510 to analyze the generated corpus of electronic documents (e.g., the modified synthetic documents), organize the electronic documents into contextually-relevant clusters, and generate semantic groups from which topics or higher level concepts can be extracted and indexed to facilitate a more efficient search of the generated corpus. In this way, employing embodiments described herein, a language model generated and indexed by language model generating component 510 can be employed to determine a command template most relevant to a received command, and thereby a corresponding action dataset based on the determined most relevant command template being mapped to (and included in) the corresponding action dataset.

The indexing component 530 can include a clustering component 532 that can organize the generated corpus of electronic documents (e.g., the modified synthetic documents) by employing a technique for clustering the electronic documents into narrow contexts automatically identified from the corpus. In accordance with various embodiments, the clustering component 532 can analyze documents, words, or phrases, and generate associations there between and/or generate lists of documents, words, or phrases, which can be stored in a cache or a memory to facilitate the various embodiments described herein. At a high level, each cluster (e.g., subset) of electronic documents generated based on documents selected from the corpus of electronic documents can represent a discourse community, or in other words, forms of communication or language to communicate a message that is contextually similar in meaning. The clustering method performed by clustering component 532 can comprise steps such as: calculating, respective to each document, a probability distribution indicative of the frequency of occurrence of each term in the document; comparing the respective probability distribution of each document with each probability distribution selected as a cluster attractor; and assigning each document to at least one cluster depending on the similarity between the compared probability distributions. In some embodiments, entropy can be advantageously utilized to identify these narrow contexts. This indexing process can generate relatively small clusters of electronic documents to be formed from the corpus, enabling more focused retrieval (e.g., for purposes of search). In various embodiments described herein, the language model generating component 510 can include an analyzing component, such as a scoring and ranking component 540, for calculating and/or ranking values (e.g., probability distributions, entropy scores, Jensen-Shannon divergence scores, weights) based on one or more input texts (e.g., any portion of an electronic document) of which can be automatically parsed and selected from one or more documents by any component of the indexing component 530, such as the clustering component 532. It is contemplated that any of the components of the language model generating component 510 can employ the scoring and ranking component 540 to determine an output based on one or more inputs provided thereto. For instance, each word can be selected from each document and be assigned a calculated importance score based on a determined entropy of the word's calculated probability distribution multiplied by the log of a determined frequency of the selected word within the entire document corpus (i.e., 1/entropy*log(document_frequency)). Once an importance score for each word is calculated, the words can be ranked based on their calculated importance scores. The ranked listing of words can then be split into a plurality of segments. For instance, employing a concept of power law, the scoring and ranking component 540 can separate the list into a predefined or maximum number (e.g., 10) of segments, whereby each segment is half the size of its previous segment. By way of a non-limiting example, for a list of 800 ranked words, the list can be broken into groups sized as 400, 200, 100, 50, 25, 12, 6, 3, and 1 word(s), respectively. Once the list is separated into segments, each segment is assigned a ranking score or value, the largest group having a highest ranking score (e.g., 10), and the smallest group having a lowest ranking score (e.g., 1). In some aspects, words included in groups ranked higher than a predefined rank (e.g., 6) can be ignored, while words included in groups ranked equal to or less than the predefined rank can be considered for further evaluation. Utilizing this technique, the clustering component 532 can remove from consideration words that are too specific, while identifying "context words" having assigned ranking scores.

In some further embodiments, the clustering component 532 can further employ a clustering technique for organizing and indexing the documents within each cluster by: assigning a respective weight to each document, the value of the weight depending on the similarity between the probability distribution of the document and the probability distribution of the cluster attractor; comparing the respective probability distribution of each document in the cluster with the probability distribution of each other document in the cluster; assigning a respective weight to each pair of compared documents, the value of the weight depending on the similarity between the compared respective probability distributions of each document of the pair; calculating a minimum spanning tree for the cluster based on the respective calculated weights, whereby the minimum spanning tree can define logical relationships between documents of a cluster based on the weights there between. In various embodiments, the language model generating component 310 can employ techniques for generating the aforementioned document clusters and corresponding minimum spanning trees as described in U.S. Pat. No. 7,747,593 (the '593 patent), titled "Computer Aided Document Retrieval," the entire contents of which is herein incorporated by reference.

In some further embodiments, employing linguistic principles of intertextuality, representative phrases corresponding to document clusters generated for indexing electronic documents can be determined. In other words, terms or phrases that are representative of a context communicated throughout the documents included in each document cluster can be identified. As noted above, the language model generating component 310 can generate document clusters having documents therein that can be logically linked to one another via a minimum spanning tree, thereby defining "neighboring" documents. In some aspects, the clustering component 532 can, for each document within a cluster (i.e., a seed document), compare the seed document relative to each other neighboring document within the generated document cluster to calculate a distance (e.g., Jensen-Shannon divergence score) (P1) between the seed document and each other neighboring document. If the calculated distance is equal to or less than a threshold value (e.g., 0.75), then the neighboring document can be defined as being within the seed document's "section." Moreover, if the neighboring document is defined within the seed document's section, another distance (P2) can be calculated between the neighboring document and each extended neighboring document of the neighboring document (e.g., the neighbor of the neighboring document). In this regard, a distance between the seed document and the extended neighboring document can then be calculated based on both of the calculated distances (P1 and P2). In some aspects, this distance can be determined based on the formula: $1-(1-P1)(1-P2)$. Similarly, if the calculated distance between the seed document and the extended neighboring document is equal to or less than a threshold value (e.g., 0.75), then the extended neighboring document can also be defined as being within the seed document's "section." In some aspects, this process can continue between the seed document, neighboring documents, and/or further extended neighboring documents, until a calculated distance between the seed document, each neighboring document, and each further extended neighboring documents is determined to be greater than the predefined threshold.

Utilizing the foregoing, document "sections" within a generated document cluster, each of which includes electronic documents contextually relevant to a seed document, can be identified based on the calculated distances between the seed document, neighboring document(s), and/or extended neighboring document(s), compared to a threshold. It is contemplated that some documents within a cluster may be included in one or more defined document sections associated with the document cluster.

For purposes of further explanation, each document pair between the seed document, neighboring, extended and/or further extended neighboring documents and another neighboring document within the seed document section can be referred to as a seed document pair, whereby the other document can be referenced herein as a seed pair document. In some further embodiments, the clustering component 532 can, for each seed document section (e.g., relative to a seed document), determine words or phrases that are representative of the documents included within the seed document section. For each seed document pair, the clustering component 532 can determine representative or "important" words or phrases by taking into account a determined entropy of a calculated probability distribution of each determined context word in the seed document, neighboring, extended and/or further extended neighboring documents relative to the seed pair document, and also a determined frequency of its occurrence within documents of the entire document corpus.

In some aspects, each context word of a seed document can be selected and analyzed to determine its relative weight. In some further embodiments, the clustering component 532 can calculate a weight for each word that is being considered for further evaluation, such as the context words included in groups ranked equal to or less than the predefined rank (e.g., 6). For each context word ranked equal to or less than the predefined rank, the weight is calculated based on a calculated distance (i.e., 1−distance) multiplied by its assigned ranking score (i.e., ranking score*(1−distance)). Alternatively, for context words ranked equal to or less than the predefined rank and included in a seed document that is the only document within a section, the weight is calculated based on a calculated probability that the context word will occur within the seed document multiplied by its assigned ranking score (i.e., ranking score*calculated probability). The clustering component 532 can once again rank (e.g., utilizing scoring and ranking component 540) and select a predefined number (e.g., 2) of the highest weighted words (e.g., from all document pairs within the section) as the words that are most representative of, or in other words most important to, the seed document section. In this regard, the clustering component 532 can determine, for a document cluster, a plurality of document sections that are each associated with a set of highest weighted words. In some aspects, the set of highest weighted words from each document section can include a predefined number (e.g., 2) of highest weighted words. In this way, the clustering component 532 can generate a document cluster having a plurality of document sections, each document section being associated with a set of most important (e.g., highest weighted) words, also referenced herein as "seed terms."

In some further embodiments, the clustering component 532 can determine phrases (e.g., one or more consecutive words including a seed term) that are most representative or relevant to a document cluster based on the set(s) of seed terms determined for the document sections within the cluster. The clustering component 532 can select each seed term and parse all phrases from documents within the document cluster that include the seed term. In some aspects, a maximum number of words in a phrase can be defined, such that each parsed phrase cannot exceed a predefined number of words (e.g., 4 words). In other words, each seed term can be evaluated as a single term phrase, and other multi-word phrases can also be evaluated, each multi-word phrase having up to the predefined number of words. The clustering component 532 can first determine the phrases that exist within the document cluster based on the seed terms determined for the document sections within the cluster. In other words, each seed term is selected and each document within the document cluster is searched to identify the various phrases including the seed term. The clustering component 532 can calculate a weight for each determined phrase associated with a seed term, including the single term phrase (i.e., seed term) and determined multi-word phrases, by calculating a frequency that the seed term occurs within the set(s) of seed terms determined for the document sections, multiplied by a frequency that the determined phrase occurs within the documents of the cluster. The clustering component 532 can then identify which phrase(s) associated with a seed term should be selected as representative of a document section by comparing the calculated weights for the phrases based on the number of terms included within the phrase, and determining its significance to the cluster. By way of a non-limiting example, assume that a seed word and weight is "Ireland"=870, and the determined phrases and respective weights include "Northern Ireland"=348, "Ireland Poet"=12, and "Northern Ireland Poet"=12. The weight calculated for a phrase (e.g., "Northern Ireland Poet") is compared to the weights calculated for the other phrase(s) (e.g., "Northern Ireland" and "Ireland Poet") included within the phrase. If the weight for the phrase is greater than or equal to the other phrase (e.g., "Ireland poet"≤"Northern Ireland Poet") and the difference in weights (e.g., |weight ("Ireland poet")−weight ("Northern Ireland poet")|) is less than or equal to half the weight of the other phrase (0.5*weight("Ireland poet")), then the other phrase is considered a bad phrase and is not selected as a representative phrase. In this example, "Ireland Poet" is considered a bad phrase by clustering component 532, while "Ireland," "Northern Ireland," and "Northern Ireland Poet," are selected as representative phrases. In this way, each document section in a document cluster can now be associated with a set of representative phrases, and the document cluster can be associated with a plurality of representative phrases including the associated sets of representative phrases. As referenced herein, the plurality of representative phrases associated with a document cluster can be referred to as "cluster phrases."

In some embodiments, language model generating component 510 can employ advanced linguistic concepts of discourse communities and intertextuality to strategically link (e.g., merge) the generated document clusters and by doing so, determine topics and subtopics that can be employed to more efficiently index and more efficiently search relevant documents within the document corpus. More specifically, once the clustering component 532 has determined a set of cluster phrases for each document cluster, cluster merging component 534 can further analyze the generated document clusters and corresponding cluster phrases to strategically group, link, or merge the generated document clusters and associated cluster phrases based on identified overlapping portions of the cluster phrases. For instance, with brief reference to the relational diagram 600 of FIG. 6, each document cluster 610, 620, 630 generated by clustering component 532 is associated with a corresponding determined set of cluster phrases. The cluster merging component 534 can compare the cluster phrases associated with each generated document cluster and determine whether at least a threshold number (e.g., 15) of the corresponding cluster phrases overlap or are in common with one another (e.g., intersecting cluster phrases 640, 650, 660). If the cluster merging component 534 determines that the cluster phrases between a pair of generated document clusters has at least the threshold number of intersecting cluster phrases 640, 650, the cluster merging component 534 can generate a logical link between the document clusters (e.g., cluster 610 to cluster 620, cluster 610 to cluster 630). For other pairs (e.g., cluster 620 to cluster 630) determined having less than the threshold number of intersecting cluster phrases (e.g., intersecting cluster phrases 660), a logical link is not generated. The generation of logical links or "merging" of various document clusters, by cluster merging component 534, can identify a broader hierarchical level of cluster phrases that are relevant to groups of one or more document clusters (hereinafter referred to as "cluster groups") and thereby the electronic documents included therein. In other words, cluster phrases that are associated with a set of document clusters that are linked (i.e., a set of cluster phrases corresponding to merged document clusters) can provide higher level search terms for improving efficiency when searching the electronic document corpus based on a received input, such as a command.

In some further embodiments, the indexing component 530 can include a semantic grouping component 536 that analyzes merged document clusters ("merged clusters") to identify groups of merged clusters that are similar, or in other words having contextually similar documents therein. A merged cluster can include one or more clusters merged by cluster merging component 534, and corresponding sets of cluster phrases. As referenced herein, a merged cluster can include one or more clusters, and is not necessarily limited to a plurality of clusters. In some aspects, a merged cluster can correspond to a newly generated cluster that comprises two or more clusters. With reference to the relational diagram 700 of FIG. 7, for each merged cluster, referenced herein as a "seed cluster" 710, the semantic grouping component 536 compares the associated set of cluster phrases 712 to other sets of cluster phrases 722, 732, 742, 752 associated with other merged clusters 720, 730, 740, 750. In some aspects, the semantic grouping component 536 can select a threshold quantity (e.g., 4) of other merged clusters 720, 730, 740, 750 determined to have in common at least a threshold number (e.g., 10) of cluster phrases (e.g., intersecting cluster phrases 715) with the seed cluster 710. In this regard, the semantic grouping component 536 can generate a link (e.g., an association or logical link) 710, 720 between the merged clusters (e.g., cluster 710 to cluster 720) based on the determined threshold number of common cluster phrases (e.g., intersecting cluster phrases 715) there between to generate a semantic group of electronic documents.

In some further aspects, the semantic grouping component 536 can determine that the threshold quantity of the other merged clusters 730, 740, 750, compared to the seed cluster 710, does not meet the threshold number of cluster phrases (e.g., intersecting phrases 725, 735, 745) in common with the seed cluster 710. In this regard, the semantic grouping component 536 can determine one or more stem terms (i.e., each word) from each cluster phrase associated with the seed cluster 710. For instance, the cluster phrase "Northern Ireland" includes stem terms "Northern" and "Ireland." The semantic grouping component 536 can then calculate a frequency of each stem term with respect to the phrases associated with the cluster, meaning that a frequency is determined that the stem term occurs or is included within the cluster phrases 732, 742, 752 associated with the seed cluster 710. Further, the semantic grouping component 536 can normalize, or in other words calculate a probability distribution (a "cluster description profile"), for each stem term within the cluster phrases associated with the seed cluster based on the frequenc(ies) determined for the stem terms within the cluster phrase. The semantic grouping component 536 can thus associate the cluster description profile with the seed cluster as a proxy attractor.

Further, the semantic grouping component 536 can calculate a distance (e.g., Jenson-Shannon divergence score) based on the proxy attractors of the seed cluster relative to the cluster attractors associated with at most a threshold quantity (e.g., 4) of other merged clusters 730, 740, 750. To this end, the semantic grouping component 536 can select the other merged clusters determined to have a lowest calculated distance until the threshold quantity (e.g., 4) of other merged clusters is met. The semantic grouping component 536 can thus generate a group of merged clusters ("cluster group") that includes the seed cluster 710 up to the threshold number of other merged clusters that are determined similar to the seed cluster 710.

Figure 8:
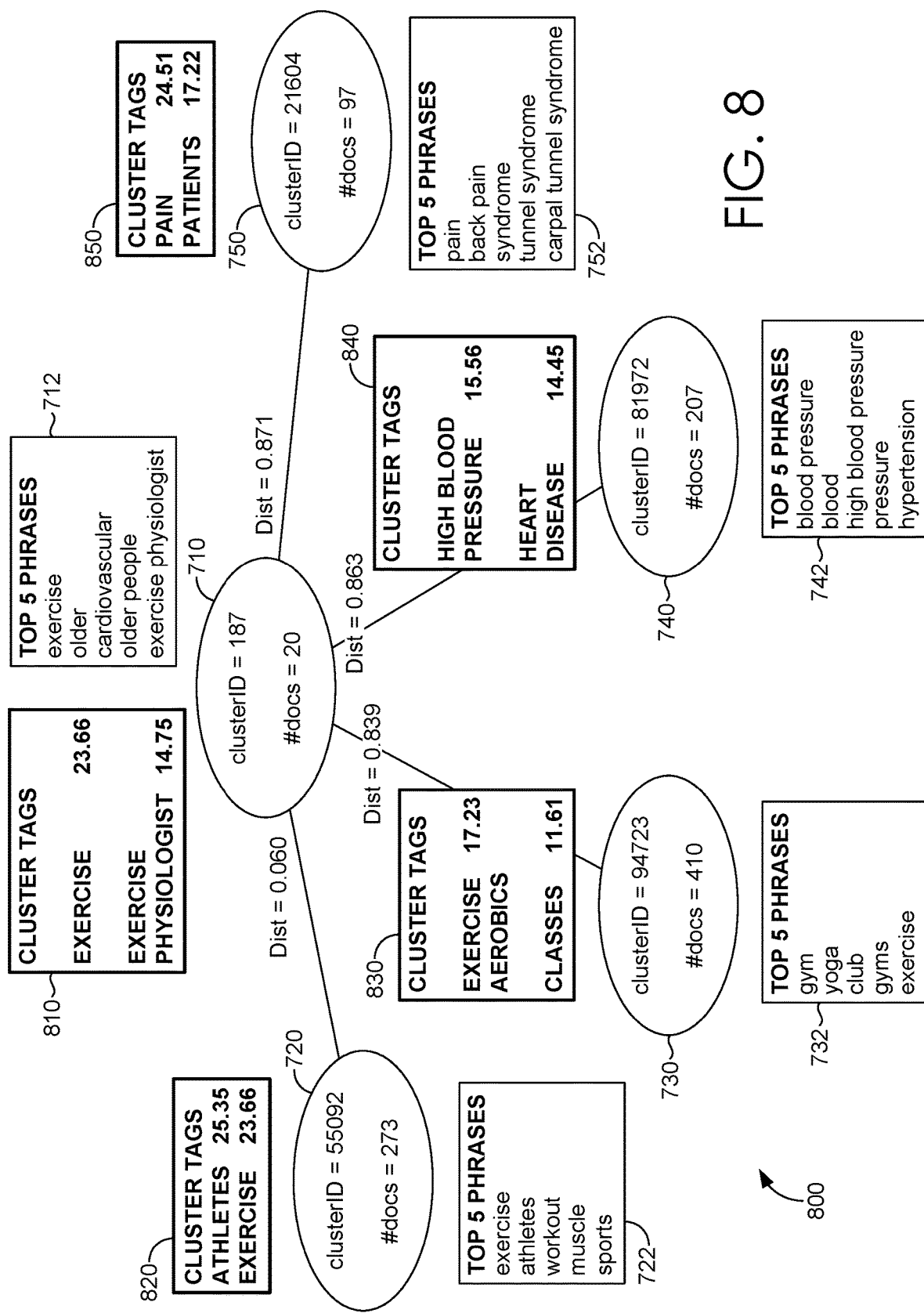

Referencing back to FIG. 5 and described with respect to the relational diagram 800 of FIG. 8, provided that a cluster group including a corresponding set of merged clusters is generated by semantic grouping component 536, the indexing component 530 can employ topic extraction component 538 to further organize the corpus into identified topics and concepts. Among other things, topic extraction component 538 can determine the top two most important or relevant cluster phrases, referenced herein as "cluster tags," for each merged cluster (i.e., a seed cluster) in the cluster group. The topic extraction component 538 can, for each cluster phrase of a seed cluster, calculate a weight for the cluster phrase utilizing the below formula:

$$\text{tag} = \underset{phase:p}{\arg\max} \sum_{\substack{similiar \\ cluster:c}} \log(2 + \text{phrase\_frequency}\,(p, c)),$$

where phrase_frequency corresponds to a number of documents within the seed cluster containing the cluster phrase. The topic extraction component 538 can rank the cluster phrases, such that the cluster phrases determined to have the highest weight are selected as the "cluster tags" of the merged cluster. In some aspects, a predefined or maximum number of cluster tags can be selected for each merged cluster. In some embodiments, the topic extraction component 538 can tag or associate a merged cluster with its selected cluster tags. This process can be repeated for each merged cluster in the cluster group.

Figure 9:
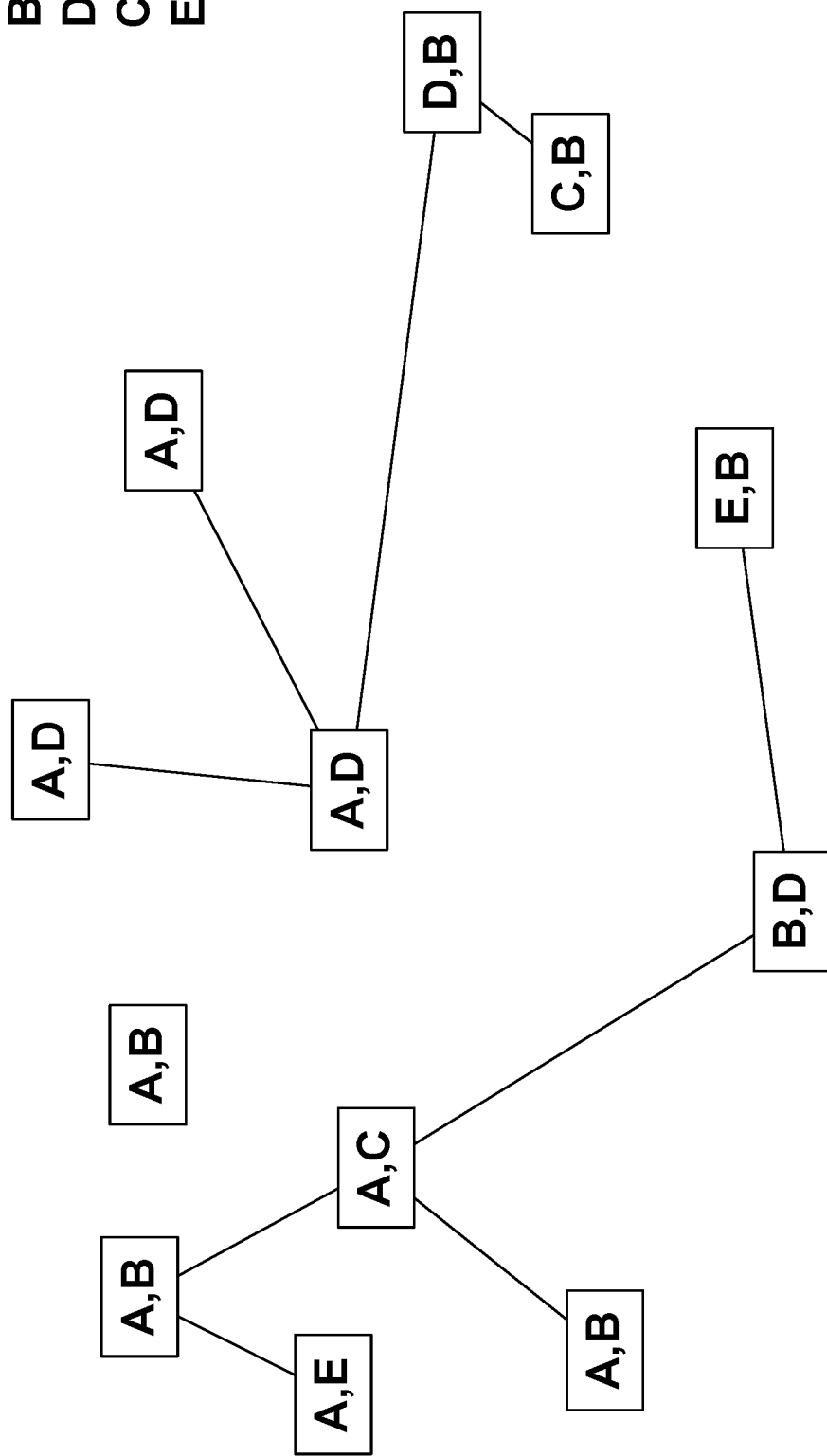
FIGS. 9-13 are relational diagrams illustrating the identification of topics and/or sub-topics from document clusters in accordance with some embodiments of the present disclosure.

With reference to FIGS. 9-13, the topic extraction component 538 can rank the cluster tags according to popularity of the tags amongst all of merged document clusters of the corpus. In FIG. 9, each of the rectangles represent a cluster or merged cluster, where some are linked to or merged with at least one other merged cluster because they are in the same cluster group. The letters depicted in FIG. 9, such as A, B, C, D, or E, each represent one of the cluster tags associated with a merged cluster in a cluster group. Provided the foregoing, topic extraction component 538 can rank the cluster tags within the entire document corpus based on a determined popularity (e.g., number of occurrences) amongst the tags associated with the various merged clusters in the document corpus.

Figure 10:
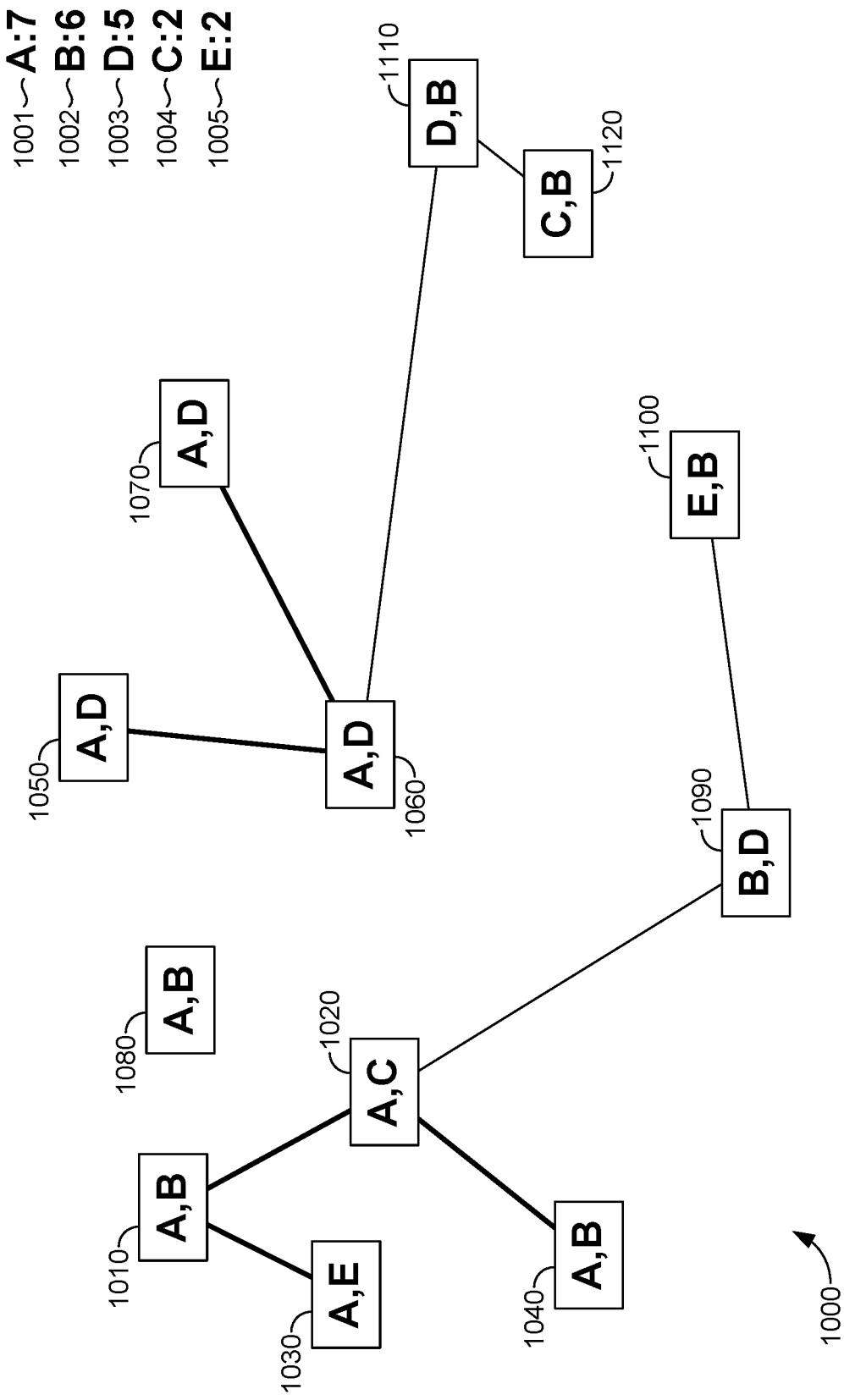
Figure 11:
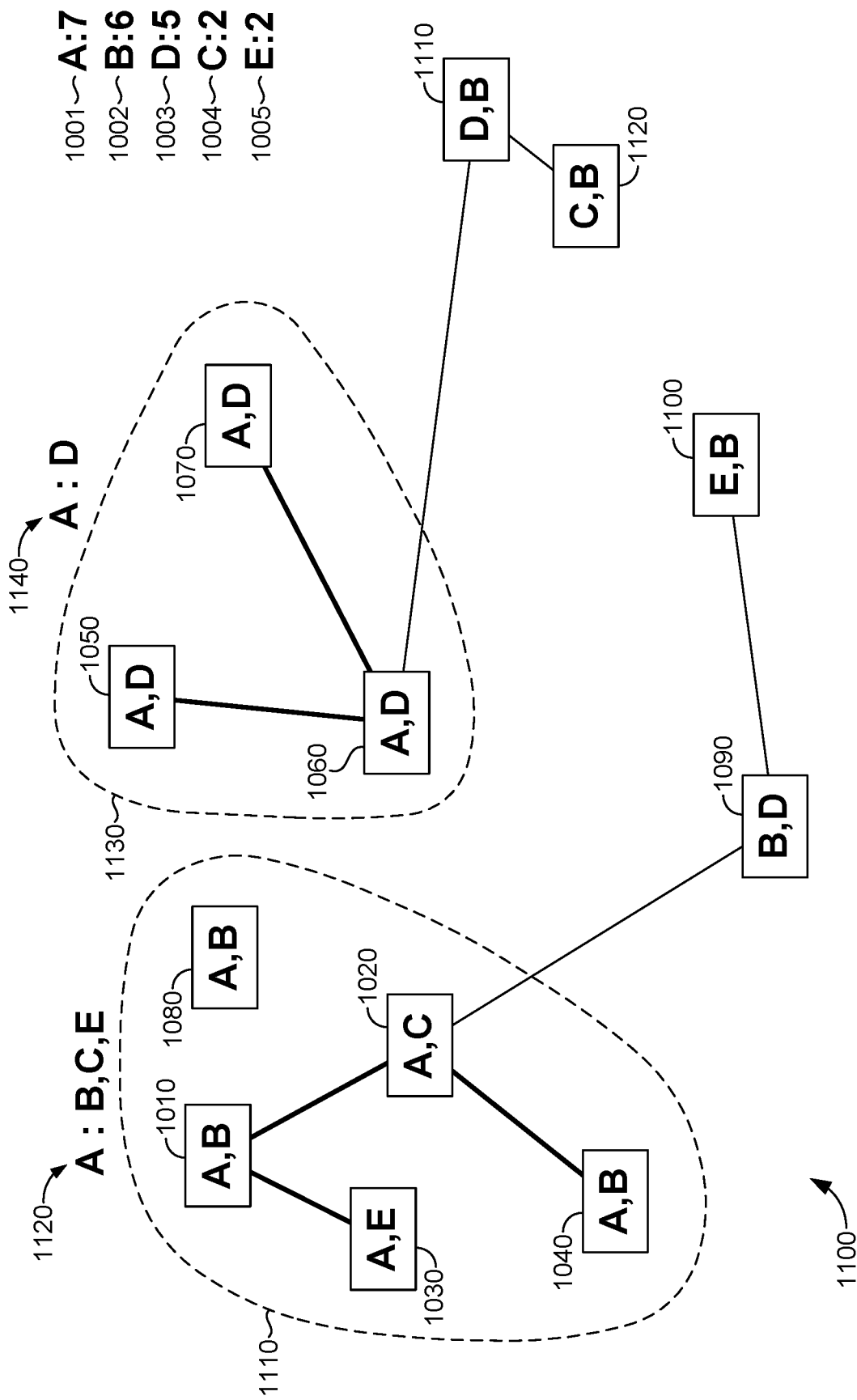

Looking now at the relational diagram 1000 of FIG. 10, starting at a determined highest ranked or most popular cluster tag represented by letter "A" 1001, the topic extraction component 538 can identify the clusters that incorporate a determined highest ranked or most frequently occurring cluster tag (e.g., "A" 1001) and that is directly linked or merged to another one of the clusters (e.g., merged clusters 1010, 1020, 1030, 1040, 1050, 1060, 1070) also having the determined highest ranked cluster tag. Looking now at the relational diagram 1100 of FIG. 11, the topic extraction component 538 can identify other merged clusters (e.g., merged cluster 1080) that is associated with the determined highest ranked cluster tag "A" 1001, and with the identified merged clusters in the same cluster group and incorporating the highest ranked tag, generate a topic-based group of merged clusters. The topic-based group can be associated with a topic and one or more sub-topics. For example, topic-based group 1110 includes merged clusters 1010, 1020, 1030, 1040, which are linked and also includes highest ranked cluster tag "A" 1001. The topic-based group 1110 further includes merged cluster 1080, because it incorporates the highest ranked cluster tag "A" 1001. The topic-based group 1110 is generated and is associated with a defined topic "A" 1001, and defined sub-topics "B" 1002, "C" 1004, and "E" 1005 because they are each cluster tags paired with the highest-ranked cluster tag "A" 1001. The topic extraction component 538 can identify common topics, such as topic "A" having different sub-topics, as defined by topics and sub-topics 1120, 1320, based on a determination that the merged clusters are associated with different cluster groups (e.g., are not linked), among other things.

Figure 12:
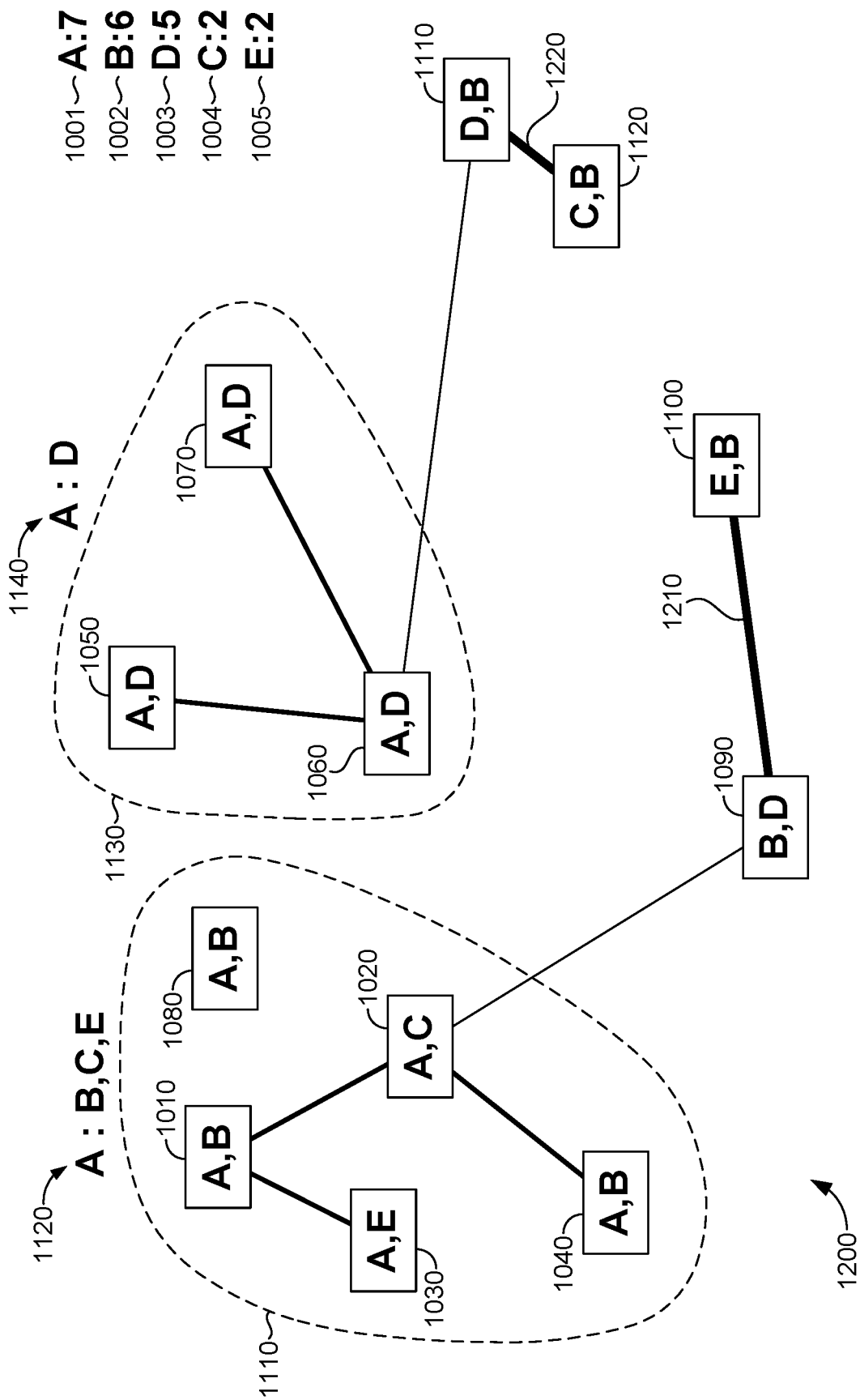

Looking now at the relational diagram 1200 of FIG. 12, the topic extraction component 538 can progress on to the next highest ranked cluster tag "B" 1002 after completing the generation of the topic-based groups 1110, 1130 associated with determined highest ranked cluster tag "A" 1001. For instance, merged clusters 1090, 1100 can be identified based on including cluster tag "B" 1002 and being directly linked 1210, as similarly performed with the identification of merged clusters in topic-based groups 1110, 1130. Similarly, merged clusters 1110, 1120 can be identified based on a determination that they are tagged with cluster tag "B" 1002 and being directly linked 1220. The topic extraction component 538 can exclude all merged clusters included in topic-based groups 1110 and 1130 because they were already included in a topic-based group.

Figure 13:
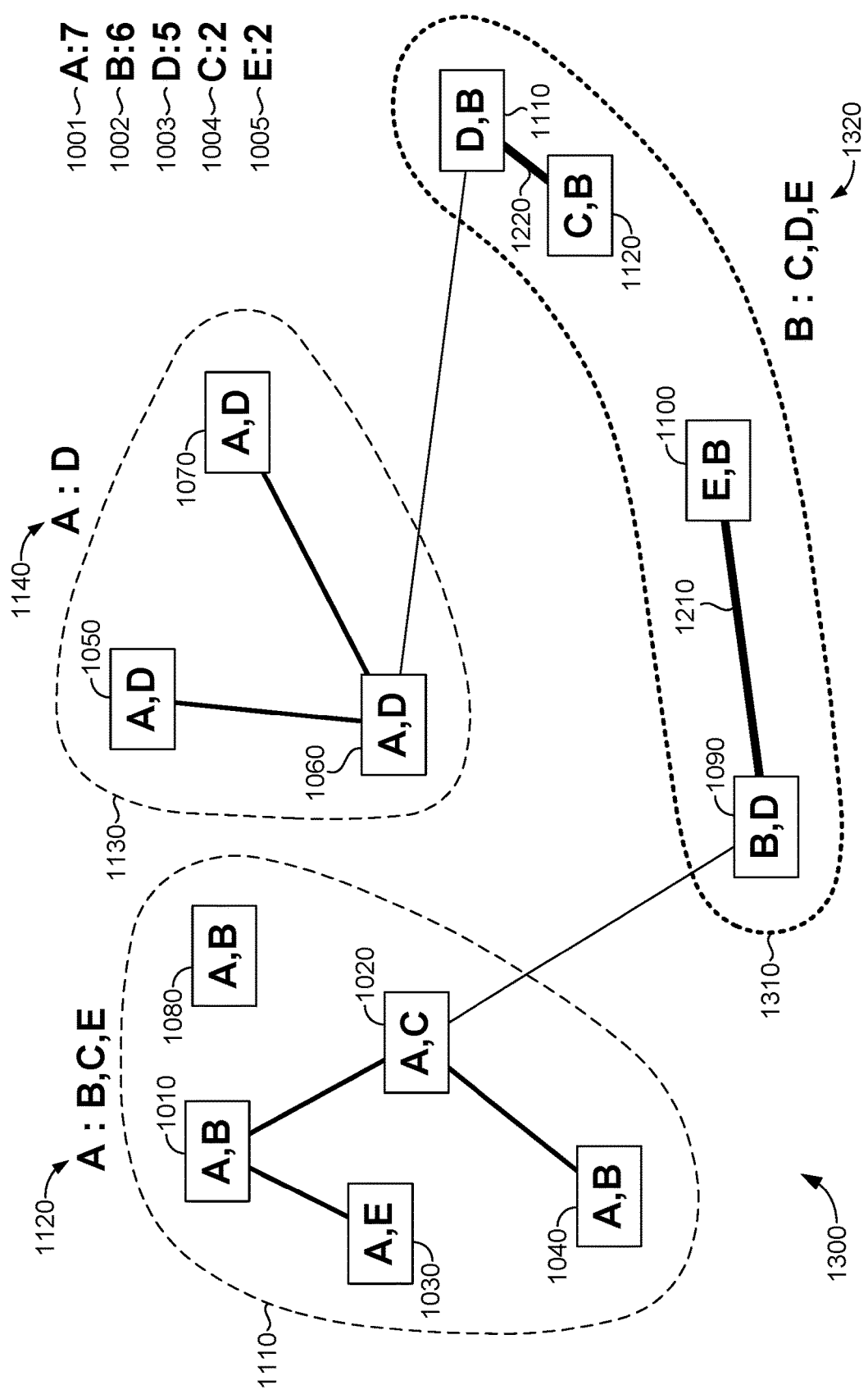

Looking now at the relational diagram 1300 of FIG. 13, the topic extraction component 538 can, similar to the generation of topic-based groups 1110 and 1130, generate one or more topic-based groups 1310 of subsequently ranked cluster tag "B" 1002. Similar to explained above, the topic-based group 1310 is generated and is associated with a defined topic "B" 1002, and defined sub-topics "C" 1004, "D" 1003, and "E" 1005 because they are each cluster tags paired with the next highest-ranked cluster tag "B" 1320. The topic extraction component 538 can identify common topics, such as topic "B" having different sub-topics, as defined by 1320, based on a determination that the merged clusters are associated with the next highest-ranked cluster, among other things. This process can be repeated until generation of topic-based groups is exhausted, or in other words, each merged cluster is associated with or included in a topic-based group having defined topics and/or sub-topics. The indexing component 530 can employ the topic-based groups, each being associated with a defined topic and/or sub-topics, to generate the index of documents within the document corpus. In this way, the index can be employed to efficiently search the electronic document corpus based on topics and/or sub-topics.

Figure 14:
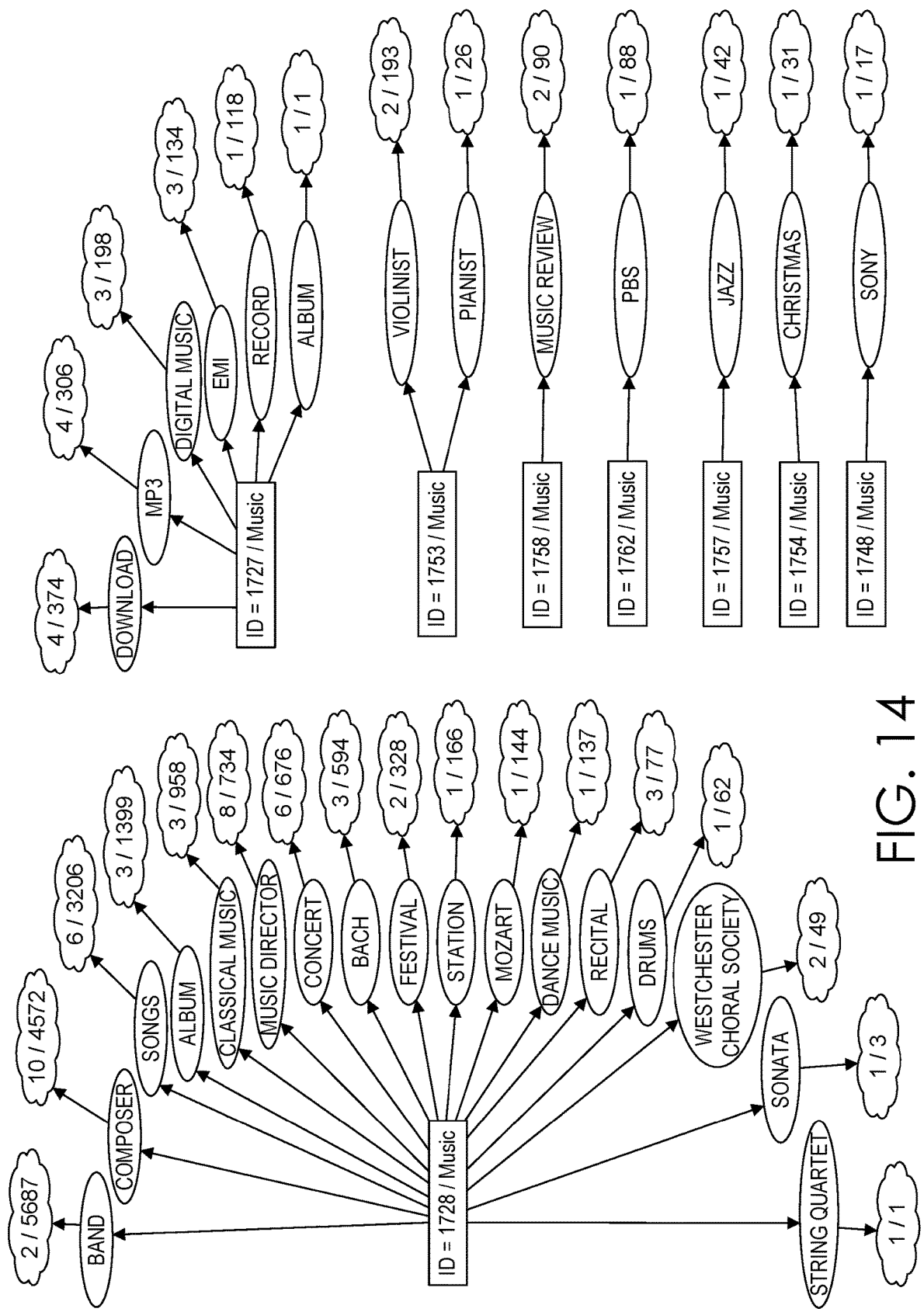
FIG. 14 is a relational diagram illustrating a document corpus having document clusters indexed based on topics and/or sub-topics in accordance with some embodiments of the present disclosure.

Employing various embodiments of the present disclosure, a digital assistant server, such as digital assistant server 300 of FIG. 3, can generate a language model having a searchable index that generates and organizes document clusters defined with topics and/or associated sub-topics determined from the content included therein, as depicted in FIG. 14. The relational diagram 1400 of FIG. 14 depicts exemplary topics and sub-topics that can be determined from an electronic document corpus based on the various techniques described herein. The determined topics and sub-topics can each be mapped to various document clusters of the document corpus, and defined in an index so that based on a received input, such as a command received from a digital assistant device 200 of FIG. 2, the index can be employed to quickly identify contextually-relevant documents from the corpus based on the received input.

Computer-Implemented Methods, Processing Flows, and Systems

Figure 15:
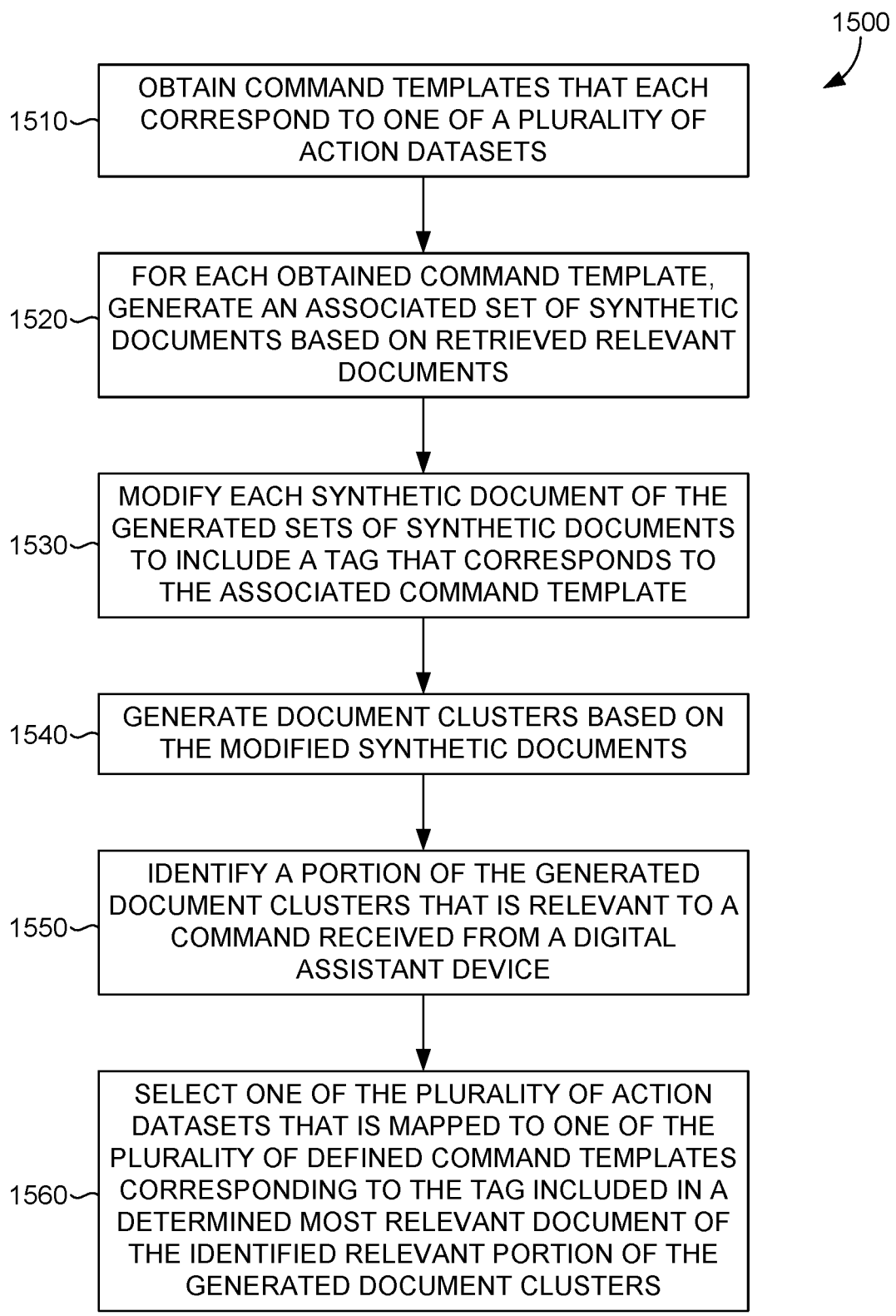
FIG. 15 is a flow diagram showing a method for generating a command-space specific language model in accordance with some embodiments of the present disclosure.

Looking now to FIG. 15, a flow diagram 1500 is provided to depict an exemplary method for interpreting and understanding commands, such as one received by a digital assistant device, in order to select a most relevant or appropriate response in accordance with some embodiments of the present disclosure. As shown at block 1510, a computing device, such as digital assistant server 302 of FIG. 3, can obtain a plurality of command templates that are each mapped to one of a plurality of action datasets, such as an action dataset 410 of FIG. 4. The action datasets can be stored in a database coupled to the computing device, such as database 140 of FIG. 1. In some aspects, the computing device can maintain a table, mapping, or index of the stored action datasets and corresponding command templates, among other things.

The computing device can generate, at block 1520, for each command template of the obtained plurality of command templates, an associated set of synthetic electronic documents. For instance, the computing device can include a language model generating component, such as language model generating component 510 of FIG. 5, to generate a corpus of electronic documents that are relevant to an application-specific command space that is defined based on the obtained plurality of command templates. In various embodiments, the computing device can generate, for each command template, a query (e.g. including terms of or corresponding to the command template) that can be submitted to a search engine to retrieve, among other things, a variety of electronic documents that are determined relevant to the query. The computing device can extract intentionally or randomly, as described herein, one or more excerpts from the retrieved variety of electronic documents to generate a plurality of synthetic electronic documents that are associated with the command template.

At block 1530, the computing device can modify, for each command template of the obtained plurality of command templates, the corresponding plurality of generated synthetic electronic documents so that each is tagged or titled with the terms or keywords of the command template. In this regard, the computing device can save the modified synthetic electronic documents so that each is tagged or titled with its corresponding command template. The modified synthetic documents stored for all of the obtained command templates can be employed as a corpus of electronic documents for purposes of generating a language model that is applicable to a digital assistant device in accordance with embodiments described herein.

At block 1540, the computing device can include an indexing component, such as indexing component 530, to analyze the corpus of electronic documents and generate an index based on a generated plurality of document clusters from the corpus. The plurality of document clusters can be analyzed, mapped, and organized based on comparisons, determined similarities, calculated entropies, generated associations, and/or probability distributions, among other things.

At block 1550, the computing device can receive a command, such as a text-based command received from a digital assistant device 210 of FIG. 2. The computing device can identify, from the generated plurality of document clusters, one or more of the clusters that are relevant to the received command. In various embodiments, the generated plurality of document clusters can be indexed to more efficiently search relevant portions of the electronic documents of the corpus based on a received input, such as a received command.

At block 1560, the computing device can select an action dataset of the plurality of stored action datasets, whereby the selected action dataset is mapped to a command template that is referenced (e.g., tagged, titled) in a determined most relevant one of the electronic documents of the determined relevant cluster. In various embodiments, the computing device can employ various components, as described in accordance with FIG. 3, to facilitate the searching, ranking, and selection of an action dataset that is determined most relevant to a received command. The computing device can employ, for instance, a language model searching component, such as a language model searching component 330 of FIG. 3, for searching the various electronic documents of the corpus, an action dataset ranking component 340 for ranking and/or boosting potentially relevant action datasets based on a variety of factors, such as obtained contextual data (e.g., received from the digital assistant device), among other things.

Figure 16:
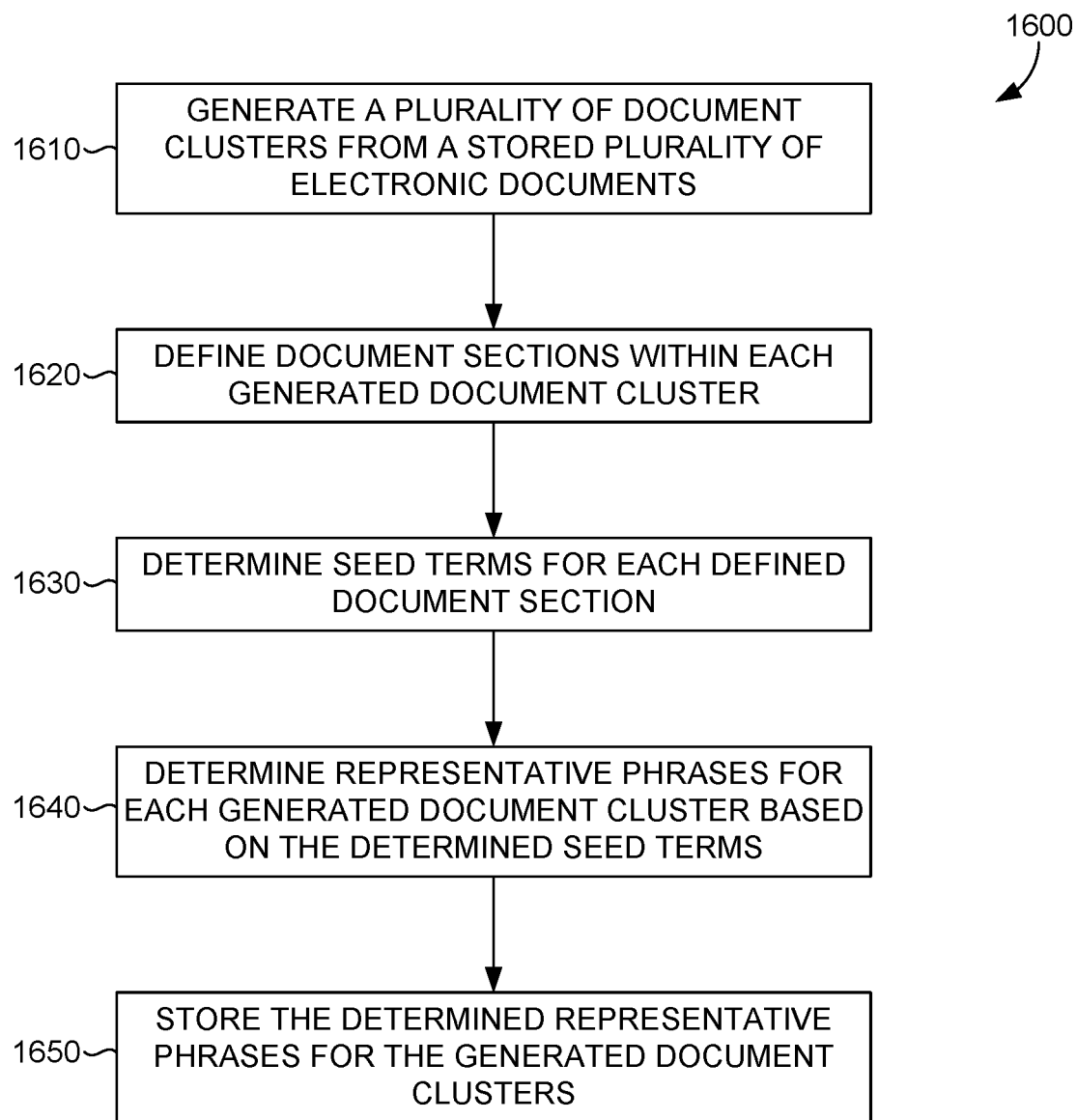
FIG. 16 is a flow diagram showing a method for extracting representative phrases from generated document clusters in accordance with some embodiments of the present disclosure.

Looking now to FIG. 16, a flow diagram 1600 is provided to depict an exemplary method for interpreting and understanding commands, such as one received by a digital assistant device, in order to select a most relevant or appropriate response (i.e., action to perform) in accordance with some embodiments of the present disclosure. As described herein, a computing device, such as digital assistant server 302 of FIG. 3, can obtain a plurality of command templates that are each mapped to one of a plurality of action datasets, such as an action dataset 410 of FIG. 4. The action datasets can be stored in a database coupled to the computing device, such as database 140 of FIG. 1. In some aspects, the computing device can generate and maintain a table, mapping, or index of the stored action datasets and corresponding command templates, among other things.

The computing device can generate, for each command template of the obtained plurality of command templates, an associated set of synthetic electronic documents. For instance, the computing device can include a language model generating component, such as language model generating component 510 of FIG. 5, to generate a corpus of electronic documents that are relevant to an application-specific command space that is defined based on the obtained plurality of command templates. In various embodiments, the computing device can generate, for each command template, a query (e.g. including terms of or corresponding to the command template) that can be submitted to a search engine to retrieve, among other things, a variety of electronic documents that are determined relevant to the query. The computing device can extract intentionally or randomly, as described herein, one or more excerpts from the retrieved variety of electronic documents to generate a plurality of synthetic electronic documents that are associated with the command template.

The computing device can modify, for each command template of the obtained plurality of command templates, the corresponding plurality of generated synthetic electronic documents so that each is tagged or titled with the terms or keywords of the command template. In this regard, the computing device can save the modified synthetic electronic documents so that each is tagged or titled with its corresponding command template. The modified synthetic documents stored for all of the obtained command templates can be employed as a corpus of electronic documents for purposes of generating a language model that is applicable to a digital assistant device in accordance with embodiments described herein. Each word can be selected from each document and can be assigned a calculated importance score based on a determined entropy of the word's calculated probability distribution multiplied by the log of a determined frequency of the selected word within the entire document corpus (i.e., 1/entropy*log(document_frequency)). Once an importance score for each word is calculated, the words can be ranked based on their calculated importance scores. The ranked listing of words can then be split into a plurality of segments, such that each document within a corresponding one of the segments is assigned a ranking score or value. In some aspects, words included in groups ranked higher than a predefined rank (e.g., 6) can be ignored, while words included in groups ranked equal to or less than the predefined rank can be considered for further evaluation. Utilizing this technique, the clustering component 532 can remove from consideration words that are too specific, while identifying "context words" having assigned ranking scores.

At block 1610, the computing device can analyze the corpus of electronic documents and generate a plurality of document clusters therefrom, as described in FIG. 5. In various embodiments, the computing device can determine cluster attractors for each document in the plurality of documents, each document comprising at least one term, the method comprising: calculating, in respect of each term, a probability distribution indicative of the frequency of occurrence of the, or each, other term that co-occurs with said term in at least one of said documents; calculating, in respect of each term, the entropy of the respective probability distribution; selecting at least one of said probability distributions as a cluster attractor depending on the respective entropy value. In some aspects, with respect to each document, a probability distribution is calculated, indicative of the frequency of occurrence of each term in the document. The computing device can compare the respective probability distribution of each document with each probability distribution selected as a cluster attractor; and assign each document to at least one cluster depending on the similarity between the compared probability distributions. In this regard, the computing device generates a plurality of document clusters, whereby relationships between the neighboring documents are defined by a spanning tree in accordance with entropy scores calculated between the documents, among other things.

At block 1620, a clustering component, such as clustering component 532 of FIG. 5, can, for each document within a cluster (i.e., a seed document), compare the seed document relative to each other neighboring document within the generated document cluster to calculate a distance (e.g., Jensen-Shannon divergence score) (P1) between the seed document and each other neighboring document and determine whether a neighboring document should be included in a document section associated with the seed document. If the calculated distance is equal to or less than a threshold value (e.g., 0.75), then the neighboring document can be defined as being within the seed document's "section." Moreover, if the neighboring document is defined within the seed document's section, another distance (P2) can be calculated between the neighboring document and each extended neighboring document of the neighboring document (e.g., the neighbor of the neighboring document). In this regard, a distance between the seed document and the extended neighboring document can then be calculated based on both of the calculated distances (P1 and P2). In some aspects, this distance can be determined based on the formula: 1−(1−P1)(1−P2). Similarly, if the calculated distance between the seed document and the extended neighboring document is equal to or less than a threshold value (e.g., 0.75), then the extended neighboring document can also be defined as being within the seed document's "section." In some aspects, this process can continue between the seed document, neighboring document(s), and/or further extended neighboring documents, until a calculated distance between the seed document, each neighboring document(s), and/or each further extended neighboring documents is determined to be greater than the predefined threshold. Utilizing the foregoing, document "sections" within a generated document cluster, each of which includes electronic documents contextually relevant to a seed document, can be identified based on the calculated distances compared to a threshold. It is contemplated that some documents within a cluster may be included in one or more defined document sections associated with the document cluster.

In some further embodiments, the clustering component can calculate a weight for each context word of each seed document. For each context word ranked equal to or less than a predefined rank, the weight is calculated based on the calculated distance multiplied by its assigned ranking score (i.e., ranking score*(1−distance)). Alternatively, for context words ranked equal to or less than the predefined rank and included in a seed document that is the only document within a section, the weight is calculated based on a calculated probability that the context word will occur within the seed document multiplied by its assigned ranking score (i.e., ranking score*calculated probability).

At block 1630, the clustering component can once again rank and select a predefined number (e.g., 2) of the highest weighted words from each seed document section as the words that are most representative of, or in other words most important to, the seed document section. In this regard, the clustering component 532 can determine, for a document cluster, a plurality of document sections that are each associated with a set of highest weighted words. In some aspects, the set of highest weighted words associated with a document section can include a predefined number (e.g., 2) of highest weighted words. In this way, the clustering component can generate a document cluster having a plurality of document sections, each document section being associated with a set of most important (e.g., highest weighted) words, also referenced herein as "seed terms."

At step 1640, the clustering component can determine phrases (e.g., one or more consecutive words including a seed term) that are most representative or relevant to a document cluster based on the set(s) of seed terms determined for the document sections within the cluster. The clustering component can select each seed term and parse all phrases from documents within the document cluster that include the seed term. In some aspects, a maximum number of words in a phrase can be defined, such that each parsed phrase cannot exceed a predefined number of words. In other words, each seed term can be evaluated as a single term phrase, and other multi-word phrases can also be evaluated, each multi-word phrase having up to the predefined number of words. The clustering component can first determine the phrases that exist within the document cluster based on the seed terms determined for the document sections within the cluster. In other words, each seed term is selected and each document within the document cluster is searched to identify the various phrases including the seed term. The clustering component can calculate a weight for each determined phrase associated with a seed term, including the single term phrase (i.e., seed term) and determined multi-word phrases, by calculating a frequency that the seed term occurs within the set(s) of seed terms determined for the document sections, multiplied by a frequency that the determined phrase occurs within the documents of the cluster. The clustering component can then identify which phrase(s) associated with a seed term should be selected as representative of a document section by comparing the calculated weights for the phrases based on the number of terms included within the phrase, and determining its significance to the cluster. In this way, each document section in a document cluster can now be associated with a set of representative phrases, and the document cluster can be associated with a plurality of representative phrases including the associated sets of representative phrases. As referenced herein, the plurality of representative phrases associated with a document cluster can be referred to as "cluster phrases." At step 1650, the computing device can store the determined representative phrases for each document cluster in a memory. In some embodiments, the determined representative phrases for each document cluster can be stored, indexed, searched, or further analyzed to extract topics and/or subtopics from the document corpus to more index the document corpus for improved searching.

In some embodiments, the language model generating component can employ advanced linguistic concepts of discourse communities and intertextuality to strategically link (e.g., merge) the generated document clusters and by doing so, determine topics and subtopics that can be employed to more efficiently index and more efficiently search relevant documents within the document corpus. More specifically, once the clustering component has determined a set of cluster phrases for each document cluster, cluster merging component can further analyze the generated document clusters and corresponding cluster phrases to strategically group, link, or merge the generated document clusters based on identified overlapping portions of the cluster phrases. The cluster merging component can compare the cluster phrases associated with each generated document cluster and determine whether at least a threshold number (e.g., 15) of the corresponding cluster phrases overlap or are in common with one another. If the cluster merging component determines that the cluster phrases between a pair of generated document clusters has at least the threshold number of intersecting cluster phrases, the cluster merging component can generate a logical link between the document clusters. In some aspects, the clusters can be merged to generate a new document cluster associated with all phrases from each merged cluster. For other pairs determined having less than the threshold number of intersecting cluster phrases, a logical link is not generated. In this regard, clusters having being analyzed by the cluster merging component can be referenced herein as merged clusters, whereby a merged cluster can include one or more clusters that may or may not have been selectively merged. The generation of logical links or "merging" of various document clusters, by cluster merging component, can identify a broader hierarchical level of cluster phrases that are relevant to groups of one or more document clusters (hereinafter referred to as "cluster groups") and thereby the electronic documents included therein. In other words, cluster phrases that are determined between a set of document clusters that are linked (i.e., a set of cluster phrases corresponding to merged document clusters) can provide higher level search terms for improving efficiency when searching the electronic document corpus based on a received input, such as a command.

In some further embodiments, the a semantic grouping component, such as semantic grouping component 536 of FIG. 5, analyzes merged document clusters ("merged clusters") to identify groups of merged clusters that are similar, or in other words having contextually similar documents therein. A merged cluster can include one or more clusters merged by cluster merging component, and corresponding sets of cluster phrases, such as those determined by cluster merging component. For each merged cluster, referenced herein as a "seed cluster", the semantic grouping component compares the associated set of cluster phrases to other sets of cluster phrases associated with other merged clusters. In some aspects, the semantic grouping component can select a threshold quantity (e.g., 4) of other merged clusters determined to have in common at least a threshold number (e.g., 10) of cluster phrases (e.g., intersecting cluster phrases) with the seed cluster. In this regard, the semantic grouping component can generate a link (e.g., an association or logical link) between the merged clusters based on the determined threshold number of intersecting cluster phrases there between to generate a semantic group of electronic documents. In some aspects, the intersecting cluster phrases can represent topics associated with the linked merged clusters.

In some further aspects, the semantic grouping component can determine that the threshold quantity of the other merged clusters compared to the seed cluster, does not meet the threshold number of cluster phrases intersecting with the seed cluster. In this regard, the semantic grouping component can determine the stem term(s) (i.e., each word) of each cluster phrase associated with the seed cluster and calculate a probability distribution of the stem term with respect to the cluster phrases associated with the seed cluster, meaning that a probability is determined that the stem term occurs or is included within the cluster phrases associated with the seed cluster. Further, the semantic grouping component can normalize, or in other words calculate a probability distribution (a "cluster description profile"), for each stem term within the cluster phrases associated with the seed cluster based on the frequenc(ies) determined for the stem terms within the cluster phrase. The semantic grouping component can thus associate the cluster description profile with the seed cluster as a proxy attractor.

Further, the semantic grouping component can calculate a distance (e.g., Jenson-Shannon divergence score) based on the proxy attractors of the seed cluster relative to the cluster attractors associated with at least a threshold quantity (e.g., 4) of other merged clusters. To this end, the semantic grouping component can select the other merged clusters determined to have a lowest entropy score until the threshold quantity of other merged clusters is met. The semantic grouping component can thus generate a group of merged clusters ("cluster group") that includes the seed cluster up to the threshold number of other merged clusters that are determined similar to the seed cluster.

Provided that a cluster group including a corresponding set of merged clusters is generated by semantic grouping component, the indexing component can employ a topic extraction component, such as topic extraction component 538 of FIG. 5, to further organize the corpus into identified topics and concepts. Among other things, topic extraction component can determine the top two most important or relevant cluster phrases, referenced herein as "cluster tags," for each merged cluster (i.e., a seed cluster) in the cluster group. The topic extraction component can, for each cluster phrase of a seed cluster, calculate a weight for the cluster phrase utilizing the formula:

$$\text{tag} = \underset{\text{phrase}:p}{\arg\max} \sum_{\substack{\text{similiar}\\\text{cluster}:c}} \log(2 + \text{phrase\_frequency}(p, c)),$$

where phrase_frequency corresponds to a number of documents within the seed cluster containing the cluster phrase. The topic extraction component can rank the cluster phrases, such that the cluster phrases determined to have the highest weight are selected as the "cluster tags" of the merged cluster. In some aspects, a predefined or maximum number of cluster tags can be selected for each merged cluster. In some embodiments, the topic extraction component can tag or associate a merged cluster with its selected cluster tags. This process can be repeated for each merged cluster in the cluster group. The topic extraction component can rank the cluster tags according to popularity of the tags amongst all of merged document clusters of the corpus.

The topic extraction component can identify the clusters that incorporate a determined highest ranked or most frequently occurring cluster tag and that is directly linked or merged to another one of the merged clusters also having the determined highest ranked cluster tag. The topic extraction component can identify other merged clusters associated with the determined highest ranked cluster tag, and with the identified merged clusters in the same cluster group and incorporating the highest ranked tag, generate a topic-based group of merged clusters. The topic-based group can be associated with a topic and one or more sub-topics. The topic extraction component can identify a plurality of topics each having different sub-topics.

The topic extraction component can progress on to the next highest ranked cluster after completing the generation of the topic-based groups associated with determined highest ranked cluster tag. Similarly, merged clusters can be identified based on a determination that they are tagged with the next highest ranked cluster and being directly linked to one another. The topic extraction component can exclude all merged clusters included in already-generated topic-based groups. This process can be repeated until generation of topic-based groups is exhausted, or in other words, each merged cluster is associated with or included in a topic-based group having defined topics and/or sub-topics. The indexing component can employ the topic-based groups, each being associated with a defined topic and/or sub-topics, to generate the index of documents within the document corpus. In this way, the index can be employed to efficiently search the electronic document corpus based on topics and/or sub-topics The computing device can store the generated topic-based groups, or the associated topics and/or sub-topics, in a memory. In some embodiments, the topics and/or sub-topics can be indexed in association with each topic-based group. To this end, the computing device can receive a command, such as a text-based command received from a digital assistant device 210 of FIG. 2. The computing device can search the index to identify, from the generated plurality of document clusters, one or more of the clusters that are relevant to the received command. In various embodiments, the generated plurality of document clusters can be indexed to more efficiently search relevant portions of the electronic documents of the corpus based on a received input, such as a received command. The computing device can select an action dataset of the plurality of stored action datasets, whereby the selected action dataset is mapped to a command template that is referenced (e.g., tagged, titled) in a determined most relevant one of the electronic documents of the determined relevant cluster. In various embodiments, the computing device can employ various components, as described in accordance with FIG. 3, to facilitate the searching, ranking, and selection of an action dataset that is determined most relevant to a received command. The computing device can employ, for instance, a language model searching component, such as a language model searching component 330 of FIG. 3, for searching the various electronic documents of the corpus; and/or an action dataset ranking component, such as action dataset ranking component 340 of FIG. 3 for ranking and/or boosting potentially relevant action datasets based on a variety of factors, such as obtained contextual data (e.g., received from the digital assistant device), among other things.

Figure 17:
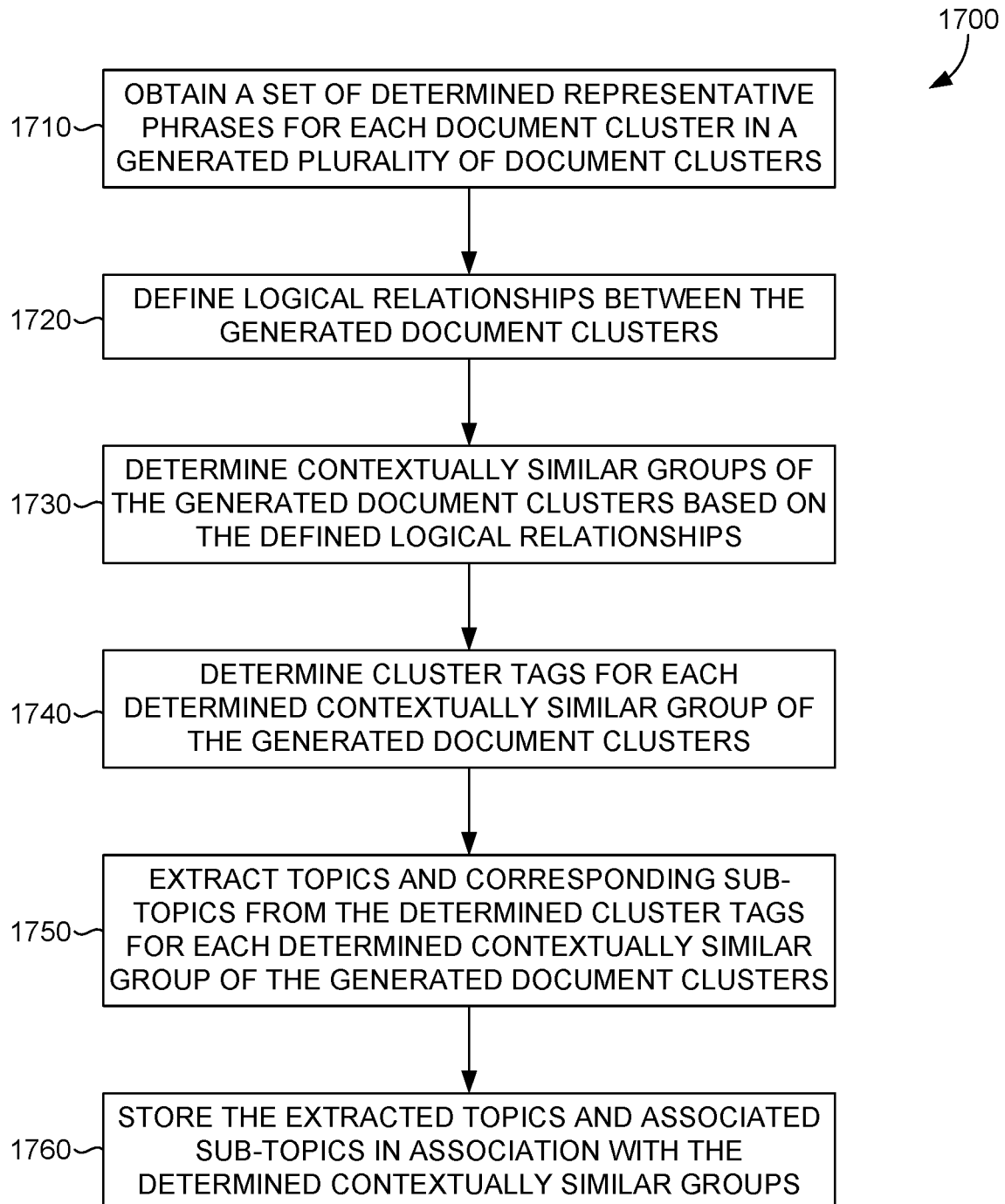
FIG. 17 is a flow diagram showing a method for extracting topics and/or sub-topics from semantically-grouped document clusters in accordance with some embodiments of the present disclosure.

Looking now to FIG. 17, a flow diagram 1700 is provided to depict an exemplary method for interpreting and understanding commands, such as one received by a digital assistant device, in order to select a most relevant or appropriate response in accordance with some embodiments of the present disclosure. As described herein, a computing device, such as digital assistant server 302 of FIG. 3, can obtain a plurality of command templates that are each mapped to one of a plurality of action datasets, such as an action dataset 410 of FIG. 4. The action datasets can be stored in a database coupled to the computing device, such as database 140 of FIG. 1. In some aspects, the computing device can maintain a table, mapping, or index of the stored action datasets and corresponding command templates, among other things.

The computing device can generate, for each command template of the obtained plurality of command templates, an associated set of synthetic electronic documents. For instance, the computing device can include a language model generating component, such as language model generating component 510 of FIG. 5, to generate a corpus of electronic documents that are relevant to an application-specific command space that is defined based on the obtained plurality of command templates. In various embodiments, the computing device can generate, for each command template, a query (e.g. including terms of or corresponding to the command template) that can be submitted to a search engine to retrieve, among other things, a variety of electronic documents that are determined relevant to the query. The computing device can extract intentionally or randomly, as described herein, one or more excerpts from the retrieved variety of electronic documents to generate a plurality of synthetic electronic documents that are associated with the command template.

The computing device can modify, for each command template of the obtained plurality of command templates, the corresponding plurality of generated synthetic electronic documents so that each is tagged or titled with the terms or keywords of the command template. In this regard, the computing device can save the modified synthetic electronic documents so that each is tagged or titled with its corresponding command template. The modified synthetic documents stored for all of the obtained command templates can be employed as a corpus of electronic documents for purposes of generating a language model that is applicable to a digital assistant device in accordance with embodiments described herein. Each word can be selected from each document and can be assigned a calculated importance score based on a determined entropy of the word's calculated probability distribution multiplied by the log of a determined frequency of the selected word within the entire document corpus (i.e., 1/entropy*log(document_frequency)). Once an importance score for each word is calculated, the words can be ranked based on their calculated importance scores. The ranked listing of words can then be split into a plurality of segments, such that each document within a corresponding one of the segments is assigned a ranking score or value.). In some aspects, words included in groups ranked higher than a predefined rank (e.g., 6) can be ignored, while words included in groups ranked equal to or less than the predefined rank can be considered for further evaluation. Utilizing this technique, the clustering component 532 can remove from consideration words that are too specific, while identifying "context words" having assigned ranking scores.

As such, the computing device can analyze the corpus of electronic documents and generate a plurality of document clusters therefrom, as described in FIG. 5. In various embodiments, the computing device can determine cluster attractors for each document in the plurality of documents, each document comprising at least one term, the method comprising: calculating, in respect of each term, a probability distribution indicative of the frequency of occurrence of the, or each, other term that co-occurs with said term in at least one of said documents; calculating, in respect of each term, the entropy of the respective probability distribution; selecting at least one of said probability distributions as a cluster attractor depending on the respective entropy value. In some aspects, with respect to each document, a probability distribution is calculated, indicative of the frequency of occurrence of each term in the document. The computing device can compare the respective probability distribution of each document with each probability distribution selected as a cluster attractor; and assign each document to at least one cluster depending on the similarity between the compared probability distributions. In this regard, the computing device generates a plurality of document clusters, whereby relationships between the neighboring documents are defined by a spanning tree in accordance with entropy scores calculated between the documents, among other things.

A clustering component, such as clustering component 532 of FIG. 5, can, for each document within a cluster (i.e., a seed document), compare the seed document relative to each other neighboring document within the generated document cluster to calculate a distance (e.g., Jensen-Shannon divergence score) (P1) between the seed document and each other neighboring document and determine whether a neighboring document should be included in a document section associated with the seed document. If the calculated distance is equal to or less than a threshold value (e.g., 0.75), then the neighboring document can be defined as being within the seed document's "section." Moreover, if the neighboring document is defined within the seed document's section, another distance (P2) can be calculated between the neighboring document and each extended neighboring document of the neighboring document (e.g., the neighbor of the neighboring document). In this regard, a distance between the seed document and the extended neighboring document can then be calculated based on both of the calculated distances (P1 and P2). In some aspects, this distance can be determined based on the formula: $1-(1-P1)(1-P2)$. Similarly, if the calculated distance between the seed document and the extended neighboring document is equal to or less than a threshold value (e.g., 0.75), then the extended neighboring document can also be defined as being within the seed document's "section." In some aspects, this process can continue between the seed document, neighboring document(s), and/or further extended neighboring documents, until a calculated distance between the seed document, neighboring document(s), and/or each further extended neighboring documents is determined to be greater than the predefined threshold. Utilizing the foregoing, document "sections" within a generated document cluster, each of which includes electronic documents contextually relevant to a seed document, can be identified based on the calculated distances compared to a threshold. It is contemplated that some documents within a cluster may be included in one or more defined document sections associated with the document cluster.

In some further embodiments, the clustering component can calculate a weight for each context word of each seed document. For each context word ranked equal to or less than a predefined rank, the weight is calculated based on the calculated distance multiplied by its assigned ranking score (i.e., ranking score*(1−distance)). Alternatively, for context words ranked equal to or less than the predefined rank and included in a seed document that is the only document within a section, the weight is calculated based on a calculated probability that the context word will occur within the seed document multiplied by its assigned ranking score (i.e., ranking score*calculated probability).

The clustering component can once again rank and select a predefined number (e.g., 2) of the highest weighted words from each seed document section as the words that are most representative of, or in other words most important to, the seed document section. In this regard, the clustering component 532 can determine, for a document cluster, a plurality of document sections that are each associated with a set of highest weighted words. In some aspects, the set of highest weighted words associated with a document section can include a predefined number (e.g., 2) of highest weighted words. In this way, the clustering component can generate a document cluster having a plurality of document sections, each document section being associated with a set of most important (e.g., highest weighted) words, also referenced herein as "seed terms."

At block 1710, the clustering component can determine phrases (e.g., one or more consecutive words including a seed term) that are most representative or relevant to a document cluster based on the set(s) of seed terms determined for the document sections within the cluster. The clustering component can select each seed term and parse all phrases from documents within the document cluster that include the seed term. In some aspects, a maximum number of words in a phrase can be defined, such that each parsed phrase cannot exceed a predefined number of words. In other words, each seed term can be evaluated as a single term phrase, and other multi-word phrases can also be evaluated, each multi-word phrase having up to the predefined number of words. The clustering component can first determine the phrases that exist within the document cluster based on the seed terms determined for the document sections within the cluster. In other words, each seed term is selected and each document within the document cluster is searched to identify the various phrases including the seed term. The clustering component can calculate a weight for each determined phrase associated with a seed term, including the single term phrase (i.e., seed term) and determined multi-word phrases, by calculating a frequency that the seed term occurs within the set(s) of seed terms determined for the document sections, multiplied by a frequency that the determined phrase occurs within the documents of the cluster. The clustering component can then identify which phrase(s) associated with a seed term should be selected as representative of a document section by comparing the calculated weights for the phrases based on the number of terms included within the phrase, and determining its significance to the cluster. In this way, each document section in a document cluster can now be associated with a set of representative phrases, and the document cluster can be associated with a plurality of representative phrases including the associated sets of representative phrases. As referenced herein, the plurality of representative phrases associated with a document cluster can be referred to as "cluster phrases." The computing device can store the determined representative phrases for each document cluster in a memory. In some embodiments, the determined representative phrases for each document cluster can be stored, indexed, searched, or further analyzed to extract topics and/or subtopics from the document corpus to more index the document corpus for improved searching.

The language model generating component can employ advanced linguistic concepts of discourse communities and intertextuality to strategically link (e.g., merge) the generated document clusters and by doing so, determine topics and subtopics that can be employed to more efficiently index and more efficiently search relevant documents within the document corpus. At block 1720, once the clustering component has determined a set of cluster phrases for each document cluster, cluster merging component can further analyze the generated document clusters and corresponding cluster phrases to strategically group, link, or merge the generated document clusters based on identified overlapping portions of the cluster phrases, among other things. The cluster merging component can compare the cluster phrases associated with each generated document cluster and determine whether at least a threshold number (e.g., 15) of the corresponding cluster phrases overlap or are in common with one another. If the cluster merging component determines that the cluster phrases between a pair of generated document clusters has at least the threshold number of common cluster phrases, the cluster merging component can generate a logical link between the document clusters. In some aspects, the clusters can be merged to generate a new document cluster associated with all phrases from each merged cluster. For other pairs determined having less than the threshold number of common cluster phrases, a logical link is not generated. In this regard, clusters having being analyzed by the cluster merging component can be referenced herein as merged clusters, whereby a merged cluster can include one or more clusters that may or may not have been selectively merged. The generation of logical links or "merging" of various document clusters, by cluster merging component, can identify a broader hierarchical level of cluster phrases that are relevant to groups of one or more document clusters (hereinafter referred to as "cluster groups") and thereby the electronic documents included therein. In other words, another set of cluster phrases that are determined between a set of document clusters that are linked (i.e., a set of cluster phrases corresponding to merged document clusters) can provide higher level search terms for improving efficiency when searching the electronic document corpus based on a received input, such as a command.

At block 1730, a semantic grouping component, such as semantic grouping component 536 of FIG. 5, analyzes merged document clusters ("merged clusters") to identify groups of merged clusters that are similar, or in other words having contextually similar documents therein. A merged cluster can include one or more clusters merged by cluster merging component, and corresponding sets of cluster phrases, such as those determined by cluster merging component. For each merged cluster, referenced herein as a "seed cluster", the semantic grouping component compares the associated set of cluster phrases to other sets of cluster phrases associated with other merged clusters. In some aspects, the semantic grouping component can select a threshold quantity (e.g., 4) of other merged clusters determined to have in common at least a threshold number (e.g., 10) of cluster phrases intersecting with the seed cluster. In this regard, the semantic grouping component can generate a link (e.g., an association or logical link) between the merged clusters based on the determined threshold number of intersecting cluster phrases there between to generate a semantic group of electronic documents. In some aspects, the intersecting cluster phrases can represent topics associated with the linked merged clusters.

In some further aspects, the semantic grouping component can determine that the threshold quantity of the other merged clusters compared to the seed cluster, does not meet the threshold number of cluster phrases intersecting with the seed cluster. In this regard, the semantic grouping component can determine the stem term(s) (i.e., each word) of each cluster phrase associated with the seed cluster and calculate a probability distribution of the stem term with respect to the cluster phrases associated with the seed cluster, meaning that a probability is determined that the stem occurs or is included within the cluster phrases associated with the seed cluster. Further, the semantic grouping component can normalize, or in other words calculate a probability distribution (a "cluster description profile"), for each stem term within the cluster phrases associated with the seed cluster based on the frequenc(ies) determined for the stem terms within the cluster phrase. The semantic grouping component can thus associate the cluster description profile with the seed cluster as a proxy attractor.

Further, the semantic grouping component can calculate a distance (e.g., Jenson-Shannon divergence score) based on the proxy attractors of the seed cluster relative to the cluster attractors associated with at least a threshold quantity (e.g., 4) of other merged clusters. To this end, the semantic grouping component can select the other merged clusters determined to have a lowest entropy score until the threshold quantity (e.g., 4) of other merged clusters is met. The semantic grouping component can thus generate a group of merged clusters ("cluster group") that includes the seed cluster up to the threshold number of other merged clusters that are determined similar to the seed cluster.

Provided that a cluster group including a corresponding set of merged clusters is generated by semantic grouping component, the indexing component can employ a topic extraction component, such as topic extraction component 538 of FIG. 5, to further organize the corpus into identified topics and concepts. Among other things, topic extraction component can, at block 1740, determine the top two most important or relevant cluster phrases, referenced herein as "cluster tags," for each merged cluster (i.e., a seed cluster) in the cluster group. The topic extraction component can, for each cluster phrase of a seed cluster, calculate a weight for the cluster phrase utilizing the formula:

$$\text{tag} = \underset{phase:p}{\arg\max} \sum_{\substack{similiar \\ cluster:c}} \log(2 + \text{phrase\_frequency}\,(p, c)),$$

where phrase_frequency corresponds to a number of documents within the seed cluster containing the cluster phrase. The topic extraction component can rank the cluster phrases, such that the cluster phrases determined to have the highest weight are selected as the "cluster tags" of the merged cluster. In some aspects, a predefined or maximum number of cluster tags can be selected for each merged cluster. In some embodiments, the topic extraction component can tag or associate a merged cluster with its selected cluster tags. This process can be repeated for each merged cluster in the cluster group. The topic extraction component can rank the cluster tags according to popularity of the tags amongst all of merged document clusters of the corpus. Further, topic extraction component can rank the cluster tags within the entire document corpus based on a determined popularity (e.g., number of occurrences) amongst the tags associated with the various merged clusters in the document corpus.

At block 1750, the topic extraction component can extract topics and corresponding sub-topics from the determined cluster tags, for association with each cluster group. The topic extraction component can identify the clusters that incorporate a determined highest ranked or most frequently occurring cluster tag and that is directly linked or merged to another one of the merged clusters also having the determined highest ranked cluster tag. The topic extraction component can identify other merged clusters associated with the determined highest ranked cluster tag, and with the identified merged clusters in the same cluster group and incorporating the highest ranked tag, generate a topic-based group of merged clusters. The topic-based group can be associated with a topic and one or more sub-topics. The topic extraction component can identify a plurality of topics each having different sub-topics.

The topic extraction component can progress on to the next highest ranked cluster after completing the generation of the topic-based groups associated with determined highest ranked cluster tag. Similarly, merged clusters can be identified based on a determination that they are tagged with the next highest ranked cluster and being directly linked to one another. The topic extraction component can exclude all merged clusters included in already-generated topic-based groups. This process can be repeated until generation of topic-based groups is exhausted, or in other words, each merged cluster is associated with or included in a topic-based group having defined topics and/or sub-topics. The indexing component can employ the topic-based groups, each being associated with a defined topic and/or sub-topics, to generate the index of documents within the document corpus. In this way, the index can be employed to efficiently search the electronic document corpus based on topics and/or sub-topics At block 1760, the computing device can store the generated topic-based groups, or the associated topics and/or sub-topics, in a memory. In some embodiments, the topics and/or sub-topics can be indexed in association with each topic-based group. To this end, the computing device can receive a command, such as a text-based command received from a digital assistant device 210 of FIG. 2. The computing device can search the index to identify, from the generated plurality of document clusters, one or more of the clusters that are relevant to the received command. In various embodiments, the generated plurality of document clusters can be indexed to more efficiently search relevant portions of the electronic documents of the corpus based on a received input, such as a received command. The computing device can select an action dataset of the plurality of stored action datasets, whereby the selected action dataset is mapped to a command template that is referenced (e.g., tagged, titled) in a determined most relevant one of the electronic documents of the determined relevant cluster. In various embodiments, the computing device can employ various components, as described in accordance with FIG. 3, to facilitate the searching, ranking, and selection of an action dataset that is determined most relevant to a received command. The computing device can employ, for instance, a language model searching component, such as a language model searching component 330 of FIG. 3, for searching the various electronic documents of the corpus, an action dataset ranking component 340 for ranking and/or boosting potentially relevant action datasets based on a variety of factors, such as obtained contextual data (e.g., received from the digital assistant device), among other things.

Having described various embodiments of the present disclosure, an exemplary operating environment in which embodiments of the disclosure can be implemented is described below in order to provide a general context for various aspects of the disclosure. Referring to the figures in general and initially to FIG. 18 in particular, an exemplary operating environment for implementing embodiments of the present disclosure is shown and designated generally as computing device 1800. The computing device 1800 is but one example of a suitable computing environment and is not intended to suggest any limitation as to the scope of use or functionality of embodiments of the disclosure. Neither should the computing device 1800 be interpreted as having any dependency or requirement relating to any one component nor any combination of components illustrated.

Embodiments of the disclosure may be described in the general context of computer code or machine-useable instructions, including computer-useable or computer-executable instructions such as program components, being executed by a computer or other machine, such as a personal data assistant or other handheld device. Generally, program components include routines, programs, objects, components, data structures, and the like, and/or refer to code that performs particular tasks or implements particular abstract data types. Embodiments of the disclosure can be practiced in a variety of system configurations, including, but not limited to, hand-held devices, consumer electronics, general-purpose computers, more specialty computing devices, and the like. Embodiments of the disclosure also can be practiced in distributed computing environments where tasks are performed by remote-processing devices that are linked through a communications network.

Figure 18:
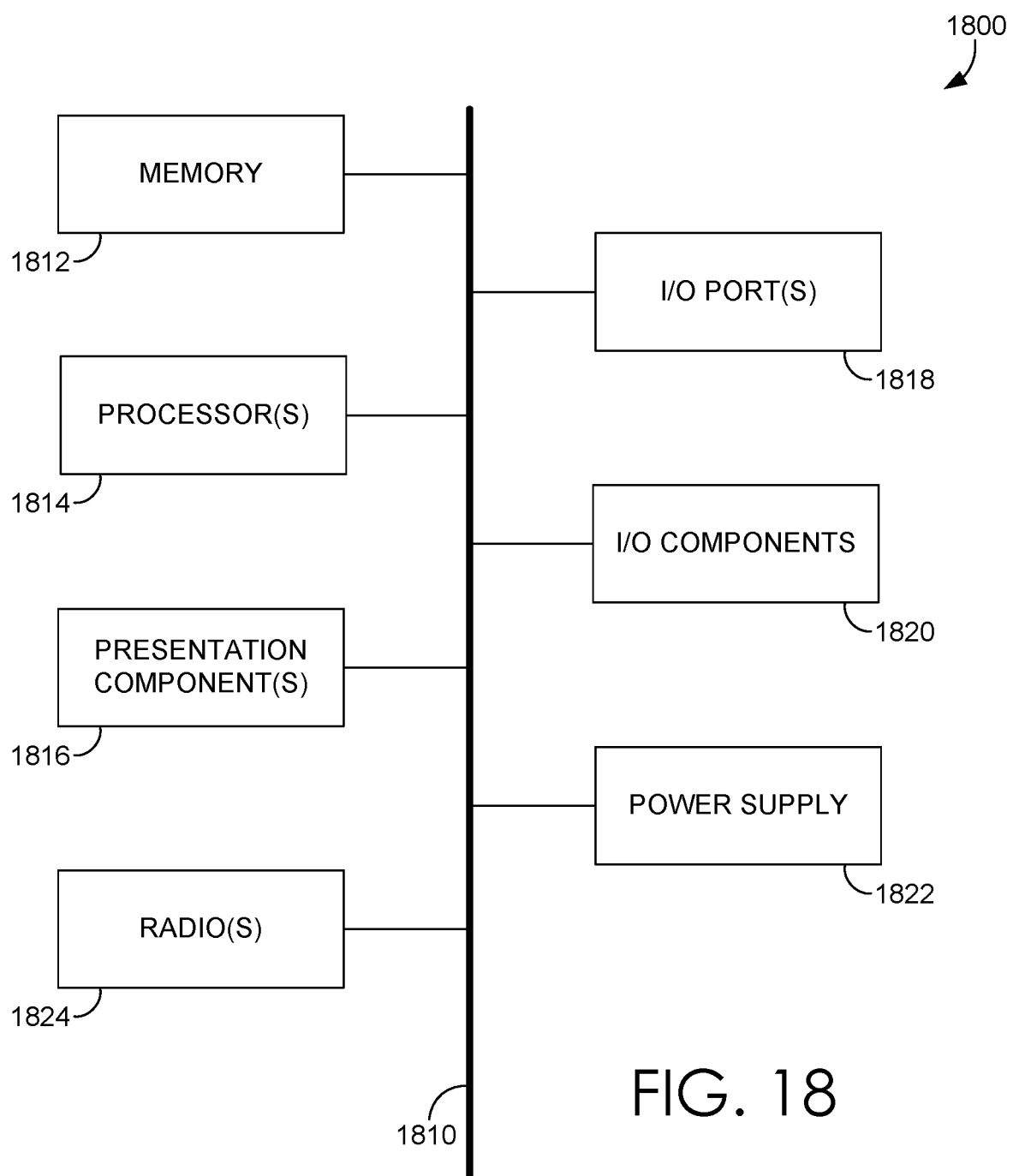
FIG. 18 is a block diagram of an exemplary computing environment suitable for use in implementing some embodiments of the present disclosure.

With continued reference to FIG. 18, the computing device 1800 includes a bus 1810 that directly or indirectly couples the following devices: a memory 1812, one or more processors 1814, one or more presentation components 1816, one or more input/output (I/O) ports 1818, one or more I/O components 1820, and an illustrative power supply 1822. The bus 1810 represents what may be one or more busses (such as an address bus, data bus, or combination thereof). Although the various blocks of FIG. 18 are shown with lines for the sake of clarity, in reality, these blocks represent logical, not necessarily actual, components. For example, one can consider a presentation component such as a display device to be an I/O component. Also, processors have memory. The inventors hereof recognize that such is the nature of the art, and reiterate that the diagram of FIG. 18 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 18 and reference to "computing device."

The computing device 1800 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program components or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program components or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1812 includes computer-storage media in the form of volatile and/or nonvolatile memory. The memory may be removable, non-removable, or a combination thereof. Exemplary hardware devices include solid-state memory, hard drives, optical-disc drives, and the like. The computing device 1800 includes one or more processors that read data from various entities such as the memory 1812 or the I/O components 1820. The presentation component(s) 1816 present data indications to a user or other device. Exemplary presentation components include a display device, speaker, printing component, vibrating component, and the like.

The I/O ports 1818 allow the computing device 1800 to be logically coupled to other devices including the I/O components 1820, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 1800. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1800. The computing device 1800 may be equipped with depth cameras, such as, stereoscopic camera systems, infrared camera systems, RGB camera systems, and combinations of these for gesture detection and recognition. Additionally, the computing device 1800 may be equipped with accelerometers or gyroscopes that enable detection of motion. The output of the accelerometers or gyroscopes may be provided to the display of the computing device 1800 to render immersive augmented reality or virtual reality.

Aspects of the subject matter described herein may be described in the general context of computer-executable instructions, such as program components, being executed by a mobile device. Generally, program components include routines, programs, objects, components, data structures, and so forth, which perform particular tasks or implement particular abstract data types. Aspects of the subject matter described herein also can be practiced in distributed computing environments where tasks are performed by remote processing devices that are linked through a communications network. In a distributed computing environment, program components can be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

As can be understood, embodiments of the present disclosure provide systems, methods, and computer-readable storage media for, among other things, crowdsourcing actions and commands to enable the generation, indexing, distribution, and instant use of action datasets and associated commands across all users of a digital assistant, irrespective of a received command having be specifically defined for a particular action to be performed. The present disclosure has been described in relation to particular embodiments, which are intended in all respects to be illustrative rather than restrictive. Alternative embodiments will become apparent to those of ordinary skill in the art to which the present disclosure pertains without departing from its scope.

While the disclosure is susceptible to various modifications and alternative constructions, certain illustrated embodiments thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A non-transitory computer storage medium storing computer-useable instructions that, when used by at least one computing device, cause the at least one computing device to perform operations comprising:
    obtain a plurality of command templates that are each mapped to one of a plurality of action datasets, each action dataset of the plurality of action datasets being associated with one of a plurality of applications installed on a digital assistant device;
    for each command template of the obtained plurality of command templates, generate an associated set of synthetic documents based on a determined relevant set of documents retrieved from at least one remote data repository;
    modify each synthetic document of the generated sets of synthetic documents to include a tag that corresponds to the associated command template;
    generate a plurality of document clusters based on the modified synthetic documents;
    based on a command received from the digital assistant device, identify a set of modified synthetic documents from the generated plurality of document clusters that is determined relevant to the received command; and
    select one of the plurality of action datasets mapped to one of the plurality of defined commands determined to correspond to the tag included in a determined most relevant modified synthetic document of the identified set of modified synthetic documents.

2. The medium of claim 1, the operations further comprising:
for each command template of the obtained plurality of command templates—
generate a search query based on the command; and
retrieve the determined relevant set of documents from the at least one remote data repository based on the generated search query.

3. The medium of claim 2, the operations further comprising:
for each command template of the obtained plurality of command templates—
extract a plurality of document portions from the retrieved determined relevant set of documents, wherein the associated set of synthetic documents is generated based on the extracted plurality of document portions.

4. The medium of claim 1, wherein the set of modified synthetic documents from the generated plurality of document clusters is determined relevant to the received command based on a relevance score calculated for each modified synthetic document of at least the set of modified synthetic documents.

5. The medium of claim 4, wherein the determined most relevant modified synthetic document of the identified set of modified synthetic documents has a highest calculated relevance score.

6. The medium of claim 4, wherein the set of modified synthetic documents from the generated plurality of document clusters is determined relevant to the received command based on the calculated relevance score exceeding a defined relevance score threshold.

7. The medium of claim 4, the operations further comprising:
communicating the selected action dataset to the digital assistant device, wherein the digital assistant device is configured to interpret the selected action dataset responsive to receiving the communicated selected action.

8. The medium of claim 1, wherein an action dataset corresponds to a set of defined operations executable by the digital assistant device.

9. The medium of claim 1, wherein a command template includes a corresponding set of terms.

10. A computer-implemented method for interpreting undefined commands for a digital assistant, the method comprising:
obtaining, by a computing device, a plurality of command templates that are each mapped to one of a plurality of action datasets, each action dataset of the plurality of action datasets being associated with one of a plurality of applications installed on a digital assistant device;
for each command template of the obtained plurality of command templates, generating, by the computing device, an associated set of synthetic documents based on a determined relevant set of documents retrieved from at least one remote data repository;
modifying, by the computing device, each synthetic document of the generated sets of synthetic documents to include a tag that corresponds to the associated command template;
generating, by the computing device, a plurality of document clusters based on the modified synthetic documents;
based on a command received from the digital assistant device, identifying, by the computing device, a set of modified synthetic documents from the generated plurality of document clusters that is determined relevant to the received command; and
communicating, to the digital assistant device, a selected one of the plurality of action datasets mapped to one of the plurality of obtained command templates determined to correspond to the tag included in a determined most relevant modified synthetic document of the identified set of modified synthetic documents.

11. The method of claim 10, the operations further comprising:
for each command template of the obtained plurality of command templates—
generating, by the computing device, a search query based on the command; and
retrieving, by the computing device, the determined relevant set of documents from the at least one remote data repository based on the generated search query.

12. The method of claim 11, the operations further comprising:
for each command template of the obtained plurality of command templates—
extracting, by the computing device, a plurality of document portions from the retrieved determined relevant set of documents, wherein the associated set of synthetic documents is generated based on the extracted plurality of document portions.

13. The method of claim 10, wherein the set of modified synthetic documents from the generated plurality of document clusters is determined relevant to the received command based on a relevance score calculated for each modified synthetic document of at least the set of modified synthetic documents.

14. The method of claim 13, wherein the determined most relevant modified synthetic document of the identified set of modified synthetic documents has a highest calculated relevance score.

15. The method of claim 13, wherein the set of modified synthetic documents from the generated plurality of document clusters is determined relevant to the received command based on the calculated relevance score exceeding a defined relevance score threshold.

16. The medium of claim 10, wherein an action dataset corresponds to a set of defined operations executable by the digital assistant device.

17. The medium of claim 10, wherein a command template includes a corresponding set of terms.

18. A system comprising:
at least one processor, and
at least one storage medium storing computer-useable instructions that, when used by the at least one processor, cause the at least one processor to perform operations comprising:
obtaining a plurality of command templates that are each mapped to one of a plurality of action datasets each action dataset of the plurality of action datasets being associated with one of a plurality of applications installed on a digital assistant device; and
generating, for each command template of the obtained plurality of command templates, an associated set of synthetic documents based on a determined relevant set of documents retrieved from at least one remote data repository;
modifying each synthetic document of the generated sets of synthetic documents to include a tag that corresponds to the associated command template; and
generating a plurality of document clusters based on the modified synthetic documents.

19. The system of claim 18, the operations further comprising:
- communicating with the digital assistant device, the communications including action datasets and/or commands.

20. The system of claim 19, the operations further comprising:
- identifying a set of modified synthetic documents from the generated plurality of document clusters that is determined relevant to a command received from the digital assistant device; and
- selecting one of the plurality of action datasets mapped to one of the plurality of obtained command templates determined to correspond to the tag included in a determined most relevant modified synthetic document of the identified set of modified synthetic documents.

* * * * *